tion:
United States Patent
Kim et al.

(12) United States Patent
(10) Patent No.: US 10,561,027 B2
(45) Date of Patent: Feb. 11, 2020

(54) ELECTRONIC DEVICE INCLUDING BENT DISPLAY AND METHOD OF DISPLAYING IMAGE ON BENT DISPLAY

(71) Applicant: Samsung Electronics Co., Ltd., Gyeonggi-do (KR)

(72) Inventors: Yong-Hwa Kim, Gyeonggi-do (KR); Song Hee Jung, Gyeonggi-do (KR); Sangyong Eom, Gyeonggi-do (KR); Jin-Ho Lim, Seoul (KR); Dong-Il Son, Gyeonggi-do (KR); Byounguk Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/907,972

(22) Filed: Feb. 28, 2018

(65) Prior Publication Data
US 2018/0249584 A1 Aug. 30, 2018

(30) Foreign Application Priority Data
Feb. 28, 2017 (KR) .................. 10-2017-0026133

(51) Int. Cl.
*H05K 5/00* (2006.01)
*G06F 3/0488* (2013.01)

(52) U.S. Cl.
CPC ....... *H05K 5/0017* (2013.01); *G06F 3/04886* (2013.01)

(58) Field of Classification Search
CPC .. G06F 3/04886; G06F 1/1656; G06F 1/1671; G06F 1/1652; G06F 1/1637; H05K 5/0017; H04M 1/236; H04M 1/18; H04M 1/0268; H04M 1/026; G09G 3/20; G09G 2300/0426; G09G 2310/0232; G02F 1/136286; G02F 1/13338; G02F 2201/56
See application file for complete search history.

(56) References Cited

U.S. PATENT DOCUMENTS

| 5,777,603 | A | * | 7/1998 | Jaeger | ................ G02F 1/13306 341/23 |
|---|---|---|---|---|---|
| 6,530,283 | B2 | | 3/2003 | Okada et al. | |
| 9,128,611 | B2 | | 9/2015 | Gray | |
| 9,411,451 | B2 | | 8/2016 | Myers et al. | |
| 9,525,764 | B1 | | 12/2016 | Evans et al. | |
| 2004/0051944 | A1 | | 3/2004 | Stark | |
| 2006/0197753 | A1 | | 9/2006 | Hotelling | |

(Continued)

FOREIGN PATENT DOCUMENTS

| JP | 4295883 | 7/2009 |
|---|---|---|
| WO | WO 2015/182662 | 12/2015 |

OTHER PUBLICATIONS

European Search Report dated Nov. 7, 2018 issued in counterpart application No. 18159243.7-1221, 16 pages.

(Continued)

*Primary Examiner* — James Wu
(74) *Attorney, Agent, or Firm* — The Farrell Law Firm, P.C.

(57) ABSTRACT

Disclosed is an electronic device including a display for data input/output, a bent display having a bent face formed by bending at least portion of a flat-type display and on which a mounted component is exposed, to provide a unique user experience, pleasing aesthetics, increased user function and improved grip capabilities.

14 Claims, 18 Drawing Sheets

(56) References Cited

U.S. PATENT DOCUMENTS

| | | |
|---|---|---|
| 2011/0068999 A1 | 3/2011 | Street |
| 2013/0307816 A1* | 11/2013 | Lee ..................... G06F 1/1652 |
| | | 345/174 |
| 2015/0130767 A1* | 5/2015 | Myers ................ H04M 1/0268 |
| | | 345/174 |
| 2015/0221460 A1 | 8/2015 | Teplitxky et al. |
| 2015/0227227 A1 | 8/2015 | Myers et al. |
| 2016/0334897 A1* | 11/2016 | Nakamura .......... H04M 1/0268 |
| 2017/0075444 A1 | 3/2017 | Nade |

OTHER PUBLICATIONS

European Search Report dated Jul. 5, 2018 issued in counterpart application No. 18159243.7-1221, 16 pages.

* cited by examiner

ELECTRONIC DEVICE INCLUDING BENT DISPLAY AND METHOD OF DISPLAYING IMAGE ON BENT DISPLAY

PRIORITY

This application claims priority under 35 U.S.C. § 119(a) to a Korean Patent Application which was filed in the Korean Intellectual Property Office on Feb. 28, 2017 and assigned Serial No. 10-2017-0026133, the contents of which are incorporated herein by reference.

BACKGROUND

1. Field of the Disclosure

The present disclosure relates generally to an electronic device, and more particularly, to an electronic device including a bent display, and a method of displaying an image on the bent display.

2. Description of the Related Art

Portable electronic devices, particularly smart phones, have become increasingly sophisticated, and hardware/software disparities between manufacturers are gradually decreasing. As a result, performance and design of electronic devices are steadily improving.

A bent display applied to an electronic device may include a bent region extending from a front region of the electronic device to a portion of a side face or a rear face through the side face. In such an electronic device, however, inconvenience is caused by the exclusion of a side key button that is typically disposed on a side face, due to the enlargement of the display region.

Furthermore, the inclusion of a non-protruding button such as a touch button implemented by a pressure sensor, is not intuitively provided to the user, and thus does not sufficiently replace the side key button.

As such, there exists a need in the art for an electronic device that improves the appearance and handling for the user.

SUMMARY

Aspects of the present disclosure are to address at least the above mentioned problems and/or disadvantages and to provide at least the advantages described below.

Accordingly, an aspect of the present disclosure is to provide, in an electronic device including a display for data input/output, a bent display having a bent face formed by bending at least portion of a flat-type display and on which a mounted component is exposed, to provide a unique user experience, pleasing aesthetics, increased user function and improved grip capabilities.

According to an aspect of the present disclosure, there is provided an electronic device including a housing including a first face, a second face facing away from the first face, and a side face surrounding a space between the first face and the second face, a display mounted on the housing and including a flat portion substantially corresponding to the first face and a bent portion extending in a lateral direction from the flat portion, at least one input unit disposed between the bent portion of the display and the housing and at least partially exposed outwardly through at least a portion of the bent portion, a detection circuit disposed inside the housing and electrically connected to the input unit, the detection circuit being configured to detect an operation of the at least one input unit, and at least one processor functionally connected to the detection circuit and the display and configured to perform control causing the electronic device to perform a corresponding function according to a received detection signal, wherein an interval between unit signal lines in a plurality of first signal lines arranged on the flat portion of the display is different from an interval between unit signal lines in a plurality of second signal lines disposed in the bent portion.

According to another aspect of the present disclosure, there is provided a method of displaying an image of an electronic device that includes a display having a flat portion and at least one bent portion bent from the flat portion with a predetermined curvature, the method including acquiring a raw image corresponding to an entire region of the display, determining a first image corresponding to the flat portion in the acquired raw image, determining a second image corresponding to the bent portion in the acquired raw image, optimizing the determined first image and second image, and displaying an optimized image on the display.

According to another aspect of the present disclosure, there is provided an electronic device including a display formed in at least a portion of the electronic device, and including a first region and a second region bent at a designated angle from the first region, an input unit configured to sense a user input through an opening formed in at least a portion of the second region of the display, and a bracket in which at least a portion of the input unit is functionally connected to a control circuit.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
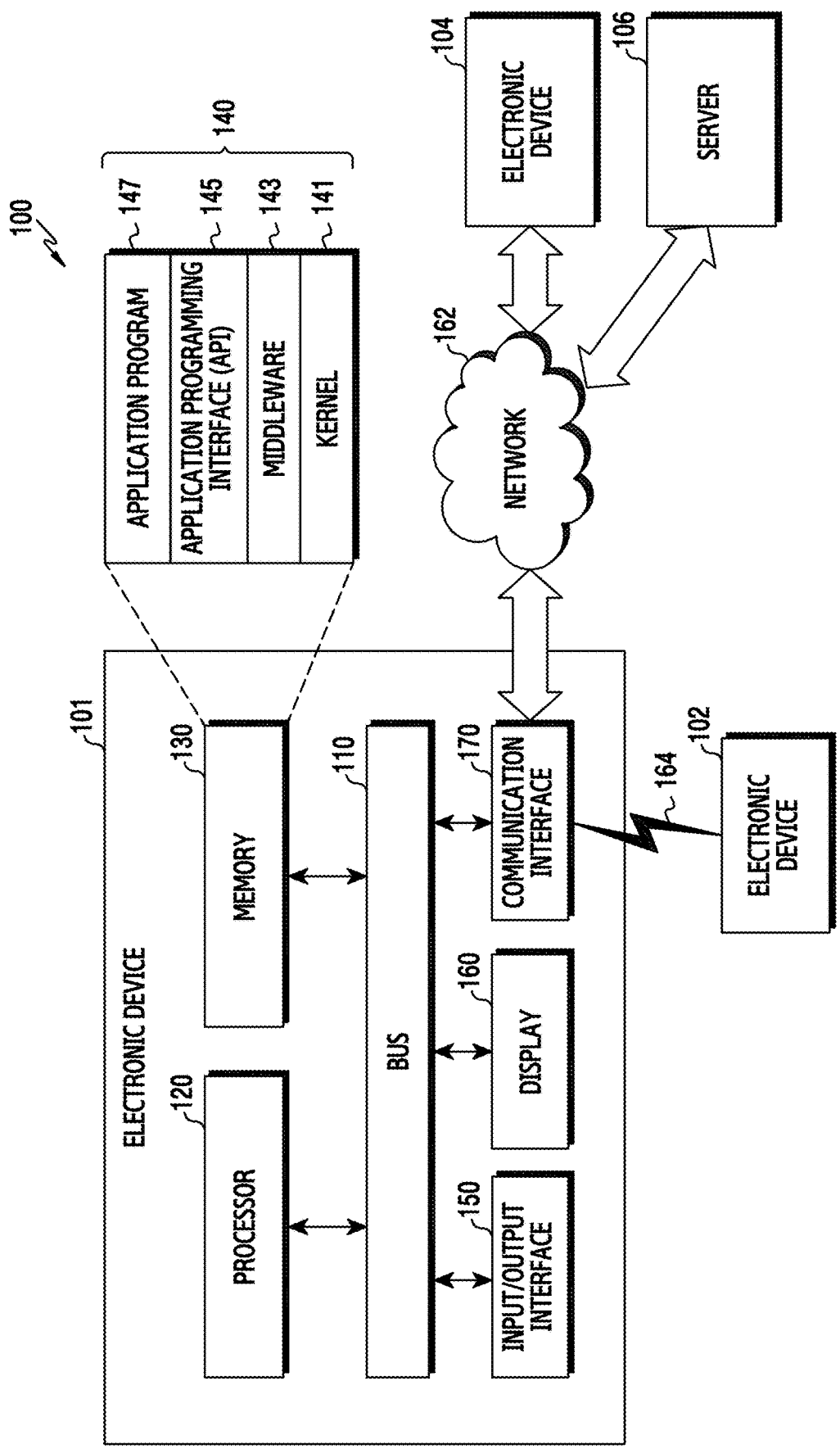
FIG. 1 illustrates a network environment that includes an electronic device according to embodiments of the present disclosure.

Embodiments of the present disclosure will now be described in greater detail with reference to the accompanying drawings. In the following disclosure, specific details such as detailed configuration and components are merely provided to assist the overall understanding of the present disclosure. Therefore, it should be apparent to those skilled in the art that various changes and modifications of the embodiments described herein can be made without departing from the present disclosure. For example, those skilled in the art will understand that the principles of the present disclosure may be implemented in any suitably arranged electronic device.

In addition, descriptions of well-known functions and implementations may be omitted for the sake of clarity and conciseness.

The terms and words used in the following description and claims are not limited to their dictionary meanings, but are used to convey a clear and consistent understanding of the present disclosure. Accordingly, it should be apparent to those skilled in the art that the following description of embodiments of the present disclosure is provided for illustrative purposes only and not for the purpose of limiting the present disclosure.

Singular terms such as "a," "an," and "the" include plural references unless the context clearly dictates otherwise. Thus, "a component surface" includes reference to one or more of such surfaces.

Herein, expressions such as "have," "may have," "include," and "may include" indicate the presence of corresponding elements, such as numerical values, functions, operations, or parts, but do not preclude the presence of additional features.

The expressions "A or B," "at least one of A or/and B," and "one or more of A or/and B" include all possible combinations of the enumerated items, i.e., indicates (1) at least one A, (2) at least one B, or (3) at least one A and at least one B.

Numerical terms such as "first" and "second" may modify various elements regardless of an order and/or importance of the elements, and do not limit the elements. These terms may be used for the purpose of distinguishing one element from another element. For example, a first user device and a second user device may indicate different user devices, regardless of the order or importance the devices. Accordingly, a first element may be referred to as a second element, and similarly, a second element may be referred to as a first element, without departing from the present disclosure.

When an element, such as a first element, is "(operatively or communicatively) coupled with/to" or "connected to" another element, such as a second element, the first element may be directly coupled with/to the second element, or there may be an intervening element, such as a third element, between the first and second elements. However, when the first element is "directly coupled with/to" or "directly connected to" the second element, there is no intervening third element.

Herein, the term "module" may refer to a unit including one of hardware, software, and firmware, or any combination thereof, and may be interchangeably used with terms, such as unit, logic, logical block, component, and circuit. A module may be a minimum unit of an integrally constituted component or may be a part thereof, may be a minimum unit for performing one or more functions or may be a part thereof, and may be mechanically or electrically implemented. For example, a module may include at least one of a dedicated processor, a central processing unit (CPU), an application-specific integrated circuit (ASIC) chip, a field-programmable gate array (FPGA), and a programmable-logic device, which are known or will be developed in the future.

All of the terms used herein, including technical or scientific terms, have the same meanings as those generally understood by a person having ordinary skill in the related art unless they are defined otherwise. Terms defined in a generally used dictionary should be interpreted as having the same or similar meanings as the contextual meanings of the relevant technology and should not be interpreted as having ideal or exaggerated meanings unless clearly defined as such herein. Even terms defined in the disclosure should not be interpreted as excluding embodiments of the present disclosure.

Example electronic devices may include smart phones, tablet personal computers (PCs), mobile phones, video telephones, electronic book readers, desktop personal computers, laptop personal computers, netbook computers, workstations, servers, personal digital assistants (PDAs), portable multimedia players (PMPs), motion picture experts group (MPEG-1 or MPEG-2) audio layer 3 (MP3) players, mobile medical devices, cameras, and/or wearable devices, but are not limited thereto.

The wearable devices may include accessory-type wearable devices, such as watches, rings, bracelets, anklets, necklaces, glasses, contact lenses, or head-mounted-devices (HMDs), fabric or clothing integral wearable devices including electronic clothes, body-mounted wearable devices including skin pads or tattoos, and/or implantable wearable devices, but are not limited thereto.

The electronic devices may include smart home appliances, such as televisions (TVs), digital versatile disk (DVD) players, audio players, refrigerators, air conditioners, cleaners, ovens, microwave ovens, washing machines, air cleaners, set-top boxes, home automation control panels, security control panels, TV boxes such as Samsung HomeSync™, Apple TV™, or Google TV™, game consoles such as Xbox™ and PlayStation™, electronic dictionaries, electronic keys, camcorders, and/or electronic picture frames, but are not limited thereto.

The electronic devices may include various portable medical measurement devices, such as blood glucose meters, heart rate monitors, blood pressure monitors, and thermometers, magnetic resonance angiography (MRA) devices, magnetic resonance imaging (MRI) devices, computed tomography (CT) devices, scanners, ultrasonic devices, etc., navigation devices, GPS receivers, event data recorders (EDRs), flight data recorders (FDRs), vehicle infotainment devices, electronic equipment for vessels, such as navigation systems and gyrocompasses, avionics, security devices, head units for vehicles, industrial or home robots, automated teller machines (ATMs), point of sales (POS) devices, and/or Internet of Things (IoT) devices, such as light bulbs, sensors, electric or gas meters, sprinkler devices, fire alarms, thermostats, street lamps, toasters, exercise equipment, hot water tanks, heaters, and boilers, but are not limited thereto.

The electronic devices may also include parts of furniture or buildings/structures, electronic boards, electronic signature receiving devices, projectors, or water meters, electricity meters, gas meters, and wave meters, may be flexible electronic devices, and may be combinations of the above-described devices but are not limited thereto, and thus may include new electronic devices according to the development of new technologies.

Herein, the term "user" may refer to a person who uses an electronic device or to an artificial intelligence (AI) electronic device which uses an electronic device.

FIG. 1 illustrates a network environment 100 including an electronic device, according to an embodiment of the present disclosure.

Referring to FIG. 1, the network environment 100 includes an electronic device 101 having a bus 110, a processor 120, a memory 130, an input/output interface 150, a display 160, and a communication interface 170, each of which including accompanying circuitry. Alternatively, the electronic device 101 may omit at least one of the illustrated components and/or include additional components.

The bus 110 may include a circuit for connecting the components and delivering communications such as a control message therebetween.

The processor 120 includes various processing circuitry, such as a dedicated processor, a central processing unit (CPU), an application processor (AP), and/or a communication processor (CP), and processes an operation or data on control of and/or communication with another component of the electronic device 101.

The processor 120 may also include a microprocessor or any suitable type of processing circuitry, such as one or more general-purpose processors, such as advanced reduced instruction set computer machine (ARM)-based processors, a digital signal processor (DSP), a programmable logic device (PLD), an ASIC, a field-programmable gate array (FPGA), a graphical processing unit (GPU), and a video card controller. In addition, when a general purpose computer accesses code for implementing the processing shown herein, the execution of the code transforms the general purpose computer into a special purpose computer for executing the processing shown herein.

The processor 120, which can be connected to a long term evolution (LTE) network, may determine whether a call is connected over a circuit switched (CS) service network using caller identification information, such as a caller phone number of the CS service network, which may be a 2nd generation (2G) or a 3rd generation (3G) network. For example, the processor 120 receives incoming call information, such as a CS notification message or a paging request message of the CS service network over the LTE network, such as circuit-switched fallback (CSFB), and receives incoming call information, such as a paging request message over the CS service network, which may be a single radio LTE (SRLTE) network.

When receiving an incoming CS notification message or a paging request message of the CS service network over the LTE network, the processor 120 may obtain caller identification information from the incoming call information, display the caller identification information on the display 160, and determine whether to connect the call based on input information corresponding to the caller identification information displayed on the display 160.

For example, when detecting input information corresponding to an incoming call rejection, through the input/output interface 150, the processor 120 may restrict the voice call connection and maintain the LTE network connection. When detecting input information corresponding to an incoming call acceptance, through the input/output interface 150, the processor 120 may connect the voice call by connecting to the CS service network.

When receiving the incoming CS notification message or a paging request message of the CS service network over the LTE network, the processor 120 may obtain caller identification information from the incoming call information, and determine whether to connect the call by comparing the caller identification information with a reception control list. For example, when the caller identification information is included in a first reception control list, such as a blacklist, the processor 120 may restrict the voice call connection and maintain the connection to the LTE network. When the caller identification information is not included in the blacklist but is included in a second reception control list, such as a white list, the processor 120 may connect the voice call by connecting to the CS service network.

When receiving the incoming call information, such as a paging request message of the CS service network over the LTE network, the processor 120 may send an incoming call response message, such as a paging response message, to the CS service network, may suspend the LTE service and receive the caller identification information, such as a circuit-switched call (CC) setup message, from the CS service network, and may determine whether to connect the call by comparing the caller identification information with the reception control list.

For example, when the caller identification information is included in the blacklist, the processor 120 restricts the voice call connection and resumes the LTE network connection. When the caller identification information is not included in the blacklist but is included in the white list, the processor 120 may connect the voice call by connecting to the CS service network.

The memory 130 may include volatile and/or nonvolatile memory, may store commands or data, such as the reception control list relating to at least another component of the electronic device 101, and may store software and/or a program 140 including a kernel 141, middleware 143, an application programming interface (API) 145, and/or application programs (or applications) 147, at least two of which being referred to as an operating system (OS).

The kernel 141 may control or manage system resources, such as the bus 110, the processor 120, or the memory 130 used for performing an operation or function implemented by the other programs, such as the middleware 143, the API 145, or the applications 147, and may provide an interface through which the middleware 143, the API 145, or the applications 147 connect the individual elements of the electronic device 101 to control or manage the system resources.

The middleware 143 may function as an intermediary for the API 145 or the applications 147 to communicate with the kernel 141 and exchange data, and may process one or more task requests received from the applications 147 according to priorities thereof For example, the middleware 143 assigns priorities for using the system resources of the electronic device 101, to at least one of the applications 147, and performs scheduling or load balancing on the one or more task requests by processing the one or more task requests according to the priorities assigned thereto.

The API 145 is an interface through which the applications 147 may control functions provided from the kernel 141 or the middleware 143, and may include at least one interface or function, such as an instruction for file control, window control, image processing, or text control.

The input/output interface 150 may include various input/output circuitry and function as an interface that transfers instructions or data input from a user or another external device to the other element(s) of the electronic device 101, and may output the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, or an electronic paper display, but is not limited thereto, may display various types of content, such as text, images, videos, icons, or symbols, and may display a web page.

The display 160 may include a touch screen, which receives a touch, a gesture, proximity, or a hovering input, using an electronic pen or a user's body part, such as a finger.

The communication interface 170 may include various communication circuitry and establish communication between the electronic device 101 and a first external electronic device 102, a second external electronic device 104, and/or a server 106. For example, the communication interface 170 communicates with the first external electronic device 102, the second external electronic device 104, and/or the server 106 through the network 162 using wireless communication or wired communication or via a short-range communication 164. For example, the wireless communication conforms to a cellular communication protocol including at least one of LTE, LTE-advanced (LTE-A), code division multiple access (CDMA), wideband code division multiple access (WCDMA), universal mobile telecommunication system (UMTS), wireless broadband (WiBro), and GSM.

The wired communication may include at least one of a universal serial bus (USB), a high definition multimedia interface (HDMI), a recommended standard 232 (RS-232), and a plain old telephone service (POTS).

The network 162 may include a telecommunications network, a computer network such as local area network (LAN) or wide area network (WAN), the Internet, and a telephone network.

The electronic device 101 may provide an LTE service in a single radio environment by use of at least one module functionally or physically separated from the processor 120.

Each of the first and second external electronic devices 102 and 104 may be the same or different type of device as the electronic device 101.

The server 106 may include a group of one or more servers.

All or some of the operations to be executed by the electronic device 101 may be executed by the first external electronic device 102, the second external electronic device 104, and/or the server 106. For example, when the electronic device 101 performs a certain function or service automatically or by request, the electronic device 101 may request some functions that are associated therewith from the first external electronic device 102, the second external electronic device 104, and/or the server 106, instead of or in addition to executing the function or service itself The first external electronic device 102, the second external electronic device 104, and/or the server 106 may execute the requested functions or additional functions, and may transmit the results to the electronic device 101, which then provides the requested functions or services by processing the received results. For example, a cloud, distributed, or client-server computing technique may be used.

According to embodiments, the processor 210 may determine a current mode of the electronic device based on a result detected in at least one of the above-described sensor modules, may generate a control signal based on the determined current mode, and may adjust an operating frequency band of a conductive member of the electronic device in a low band by controlling a tunable circuit using the corresponding control signal.

Figure 2:
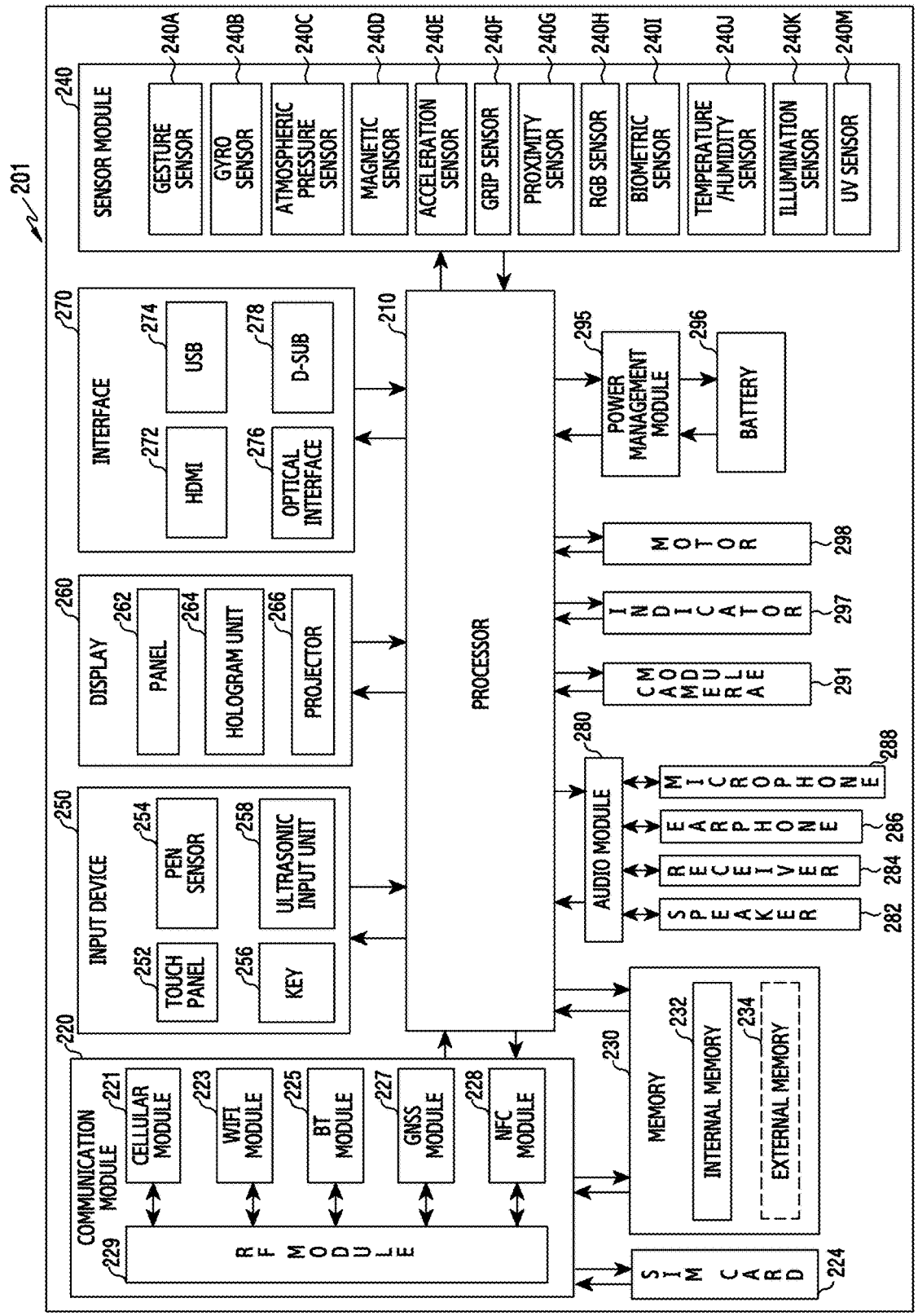
FIG. 2 illustrates a block diagram of an electronic device according to embodiments of the present disclosure.

FIG. 2 illustrates an electronic device, according to an embodiment of the present disclosure.

Referring to FIG. 2, the electronic device 201 includes a processor 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may include various processing circuitry and control a plurality of hardware or software elements connected to the processor 210 by driving an OS or an application program, may process multimedia data, perform arithmetic operations, may be implemented with a system on chip (SoC), and may further include a GPU.

The communication module 220 may include various communication circuitry and perform data transmission/reception between an external electronic device and/or a server, which may be connected with the electronic device through a network. Such circuitry, includes a cellular module 221, a Wi-Fi module 223, a Bluetooth® (BT) module 225, a global navigation satellite system (GNSS) or GPS module 227, a near field communication (NFC) module 228, and a radio frequency (RF) module 229.

The cellular module 221 may provide a voice call, a video call, a text service, or an Internet service through a communication network, such as LTE, LTE-A, CDMA, WCDMA, UMTS, WiBro, or GSM, may identify and authenticate the electronic device within the communication network by using the SIM card 224, and may perform at least some of the functions that can be provided by the processor 210, such as multimedia control functions.

The cellular module 221 may include a CP and may be implemented with an SoC. Although elements, such as the cellular module 221, the memory 230, and the power management module 295 are illustrated as separate elements with respect to the processor 210 in FIG. 2, the processor 210 may also be implemented such that at least one of the aforementioned elements is included in the processor 210.

The processor 210 or the cellular module 221 may load an instruction or data, which is received from each non-volatile memory connected thereto or at least one of different elements, to a volatile memory, may process the instruction or data, and may store data, which is received from at least one of different elements or generated by at least one of different elements, into a non-volatile memory.

Each of the Wi-Fi module 223, the BT module 225, the GNSS module 227, and the NFC module 228 may include a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least two of these modules may be included in one integrated chip (IC) or IC package. For example, at least two of processors corresponding to the modules, such as a communication processor corresponding to the cellular module 221 and a Wi-Fi processor corresponding to the Wi-Fi module 223, may be implemented with an SoC.

The RF module 229 may transmit/receive data, such as an RF signal, may include a transceiver, a power amp module (PAM), a frequency filter, or a low noise amplifier (LNA), and may further include a component for transmitting/receiving a radio wave on a free space in wireless communication, such as a conductor or a conducting wire. At least one of the above modules may transmit/receive an RF signal via a separate RF module.

The SIM card 224 may be inserted into a slot formed in the electronic device and includes unique identification information, such as an integrated circuit card identifier (ICCID) or subscriber information, such as an international mobile subscriber identity (IMSI).

The memory 230 includes an internal memory 232 and/or an external memory 234.

The internal memory 232 may include at least one of a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory, and may be a solid state drive (SSD).

The external memory 234 may include a flash drive, a compact flash (CF), secure digital (SD), micro-SD, mini-SD, extreme digital (xD), and a memory stick, and may be operatively coupled to the electronic device via various interfaces.

The electronic device may also include a storage unit (or a storage medium), such as a hard drive.

The sensor module 240 may measure a physical quantity or detect an operation state of the electronic device, and convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as a red, green, blue (RGB) sensor, a biometric sensor 240I, a temperature/humidity sensor 240J, an illumination sensor 240K, and an ultraviolet (UV) sensor 240M.

Additionally or alternatively, the sensor module 240 may include an E-node sensor, an electromyography (EMG) sensor, an electroencephalogram (EEG) sensor, an electrocardiogram (ECG) sensor, and/or a fingerprint sensor, and a control circuit for controlling at least one or more sensors included therein.

The input device 250 may include various input circuitry, such as a touch panel 252, a (digital) pen sensor 254, a key 256, and an ultrasonic input unit 258. The touch panel 252 may recognize a touch input by using at least one of an electrostatic type configuration, a pressure-sensitive type configuration, and an ultrasonic type configuration, and may further include a control circuit. When the touch panel is of the electrostatic type, both physical contact recognition and proximity recognition are possible. The touch panel 252 may further include a tactile layer, which provides the user with a tactile reaction.

The (digital) pen sensor 254 may include a recognition sheet which can be a part of the touch panel or can be separately implemented from the touch panel, and may be implemented using the same or similar method of receiving a touch input of a user or using an additional recognition sheet.

The key 256 may include a physical button, an optical key, or a keypad.

The ultrasonic input device 258 may detect ultrasonic waves generated by an input tool through a microphone 288, may confirm data corresponding to the detected ultrasonic waves, and may detect a reflected sound wave through the microphone 288 and perform radio recognition. For example, an ultrasonic signal, which may be generated by using a pen, may be reflected off an object and detected by the microphone 288.

The electronic device may use the communication module 220 to receive a user input from an external device, such as a computer or a server connected thereto.

The display 260 includes a panel 262, a hologram device 264, and a projector 266.

The panel 262 may be an LCD or an active matrix OLED (AM-OLED) and may be implemented in a flexible, transparent, or wearable manner. Alternatively, the panel 262 may be implemented as one module with the touch panel 252.

The hologram device 264 uses an interference of light and displays a stereoscopic image in the air.

The projector 266 displays an image by projecting a light beam onto a screen, which may be located inside or outside the electronic device.

The display 260 may further include a control circuit for controlling the panel 262, the hologram device 264, and/or the projector 266.

The interface 270 may include various interface circuitry, such as an HDMI 272, a USB 274, an optical communication interface 276, and a d-subminiature (D-sub) 278, and may include a mobile high-definition link (MHL), SD/multimedia card (MMC), and/or Infrared Data Association (IrDA) standard device.

The audio module 280 bilaterally converts a sound and an electric signal, and converts sound information, which is input or output through a speaker 282, a receiver 284, an earphone 286, and/or the microphone 288.

The speaker 282 may output a signal of an audible frequency band and a signal of an ultrasonic frequency band. Reflected waves of an ultrasonic signal emitted from the speaker 282 and a signal of an external audible frequency band may be received.

The camera module 291 captures an image and/or a video, and may include one or more image sensors, such as a front sensor or a rear sensor, a lens, an image signal processor (ISP), or a flash, such as an LED or a xenon lamp. Alternatively, the electronic device may include two or more camera modules.

The power management module 295 manages power of the electronic device and may include a power management integrated circuit (PMIC), a charger IC, and/or a battery gauge.

The PMIC may be included in an IC or an SoC semiconductor and may use a wired charging and/or a wireless charging method. The charger IC may charge the battery 296 and may prevent an over-voltage or over-current flow.

Different types of wireless charging may include magnetic resonance, magnetic induction, and electromagnetic types. An additional circuit for the wireless charging, such as a coil loop, a resonant circuit, and/or a rectifier may be added.

The battery gauge may measure a residual quantity of the battery 296 and a voltage, current, and temperature during charging. The battery 296 stores or generates electricity and supplies power to the electronic device by using the stored or generated electricity, and may include a rechargeable battery or a solar battery.

The indicator 297 indicates a specific state, such as a booting state, a message, or a charging state of the electronic device or a part thereof, such as the processor 210.

The motor 298 converts an electric signal into a mechanical vibration.

Alternatively, the electronic device includes a processing unit, such as a GPU, for supporting mobile TV, which processes media data according to a protocol such as digital multimedia broadcasting (DMB), digital video broadcasting (DVB), and/or media flow.

According to embodiments, a processor 210 may control a display 260 in order to display an integrated image on a first region, such as a flat portion, and at least one second region, such as a bent portion of the display 260. The processor 210 may include a DDI for controlling the display 260, and a touch driver IC (TDI) when the display 260 is used as a touch screen device. For a received raw image, the processor 210 may scale corresponding images so as to have respective corresponding resolutions based on the resolution corresponding to the flat portion of the display 260 and the resolution corresponding to the bent portion of the display 260, and may control the DDI such that a processed image can be optimized as one image and displayed on the display 260. However, the present disclosure is not limited thereto, and the operations described above may be performed directly by the DDI without intervention from the processor 210, or may be performed directly by the processor 210.

According to embodiments, the processor 210 may deform corresponding images such that the corresponding images have respective corresponding resolutions based on the resolution corresponding to the flat portion of the display 260 and the bent region of the display 260 among row images accommodated through a software program stored in the memory 230, and may perform control such that a deformed image may be optimized as one image and displayed on the display 260.

In the present disclosure, the input unit is illustrated and described as being at least partially exposed to the outside of the electronic device through the display. However, the present disclosure is not limited thereto, and the input unit may include at least one of a speaker device, a microphone device, a camera device, various sensor devices, an interface connector device, a flash device, and an external card storage device.

Each of the above-described component elements of hardware according to the present disclosure may be configured with one or more components, and the names of the corresponding component elements may vary based on the type of electronic device. The electronic device according to embodiments of the present disclosure may include at least one of the aforementioned elements. Some elements may be omitted or other additional elements may be further included in the electronic device. Also, some of the hardware components according to embodiments may be combined into one entity, which may perform functions identical to those of the relevant components prior to the combination.

Figure 3A:
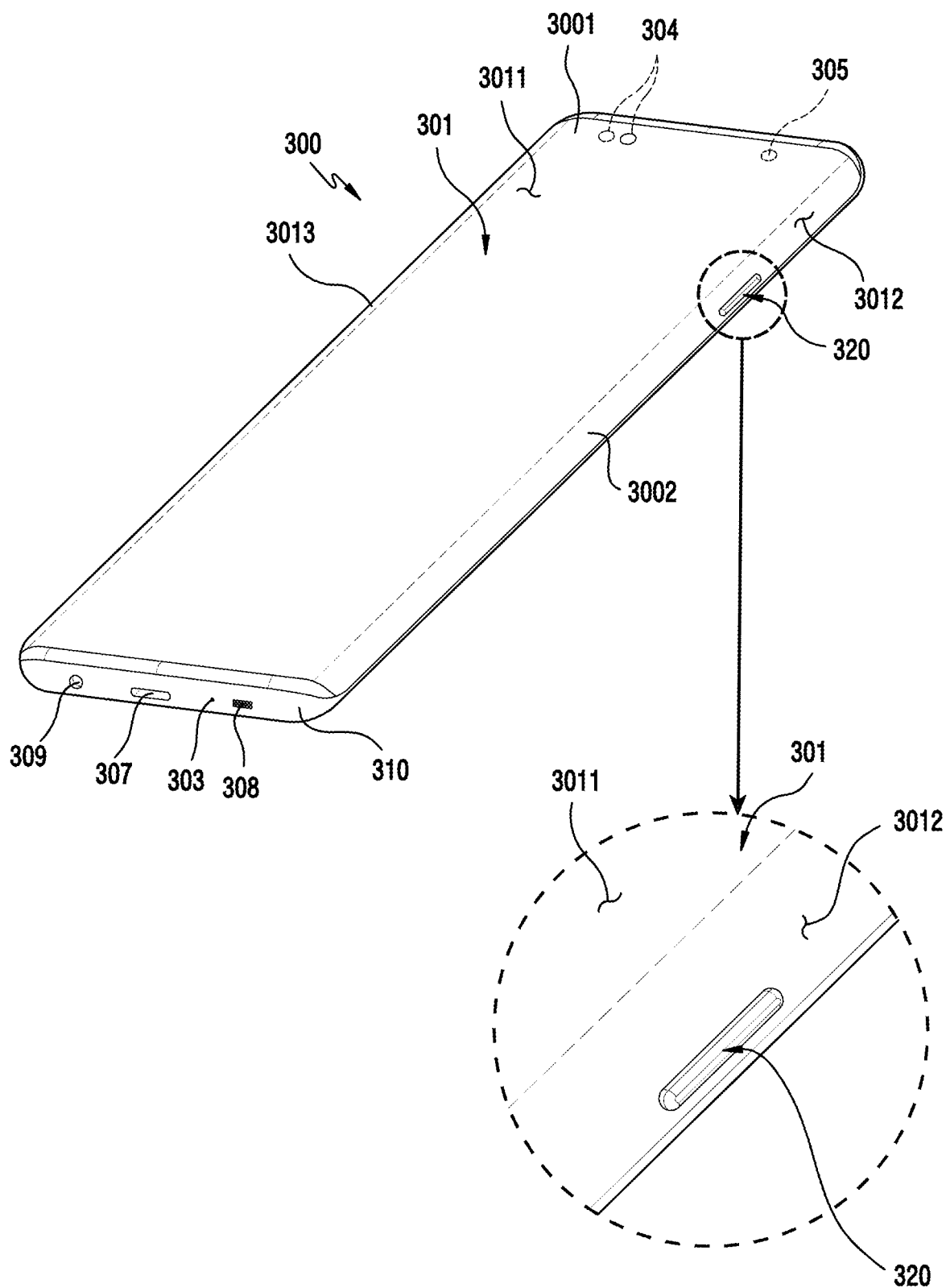
FIG. 3A is a perspective view of an electronic device according to embodiments of the present disclosure.
Figure 3B:
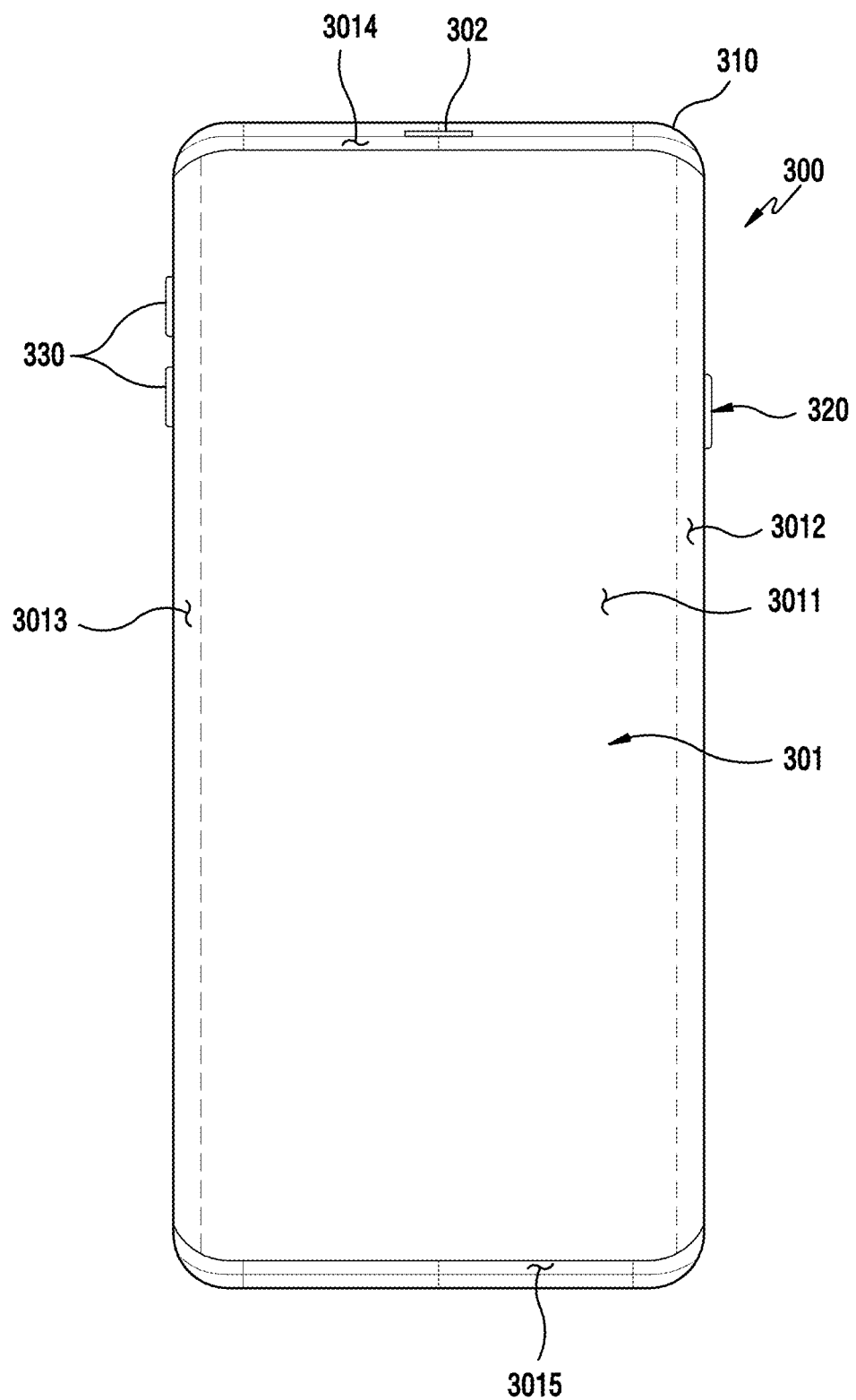
FIG. 3B is a plan view of the electronic device according to embodiments of the present disclosure.
Figure 3C:
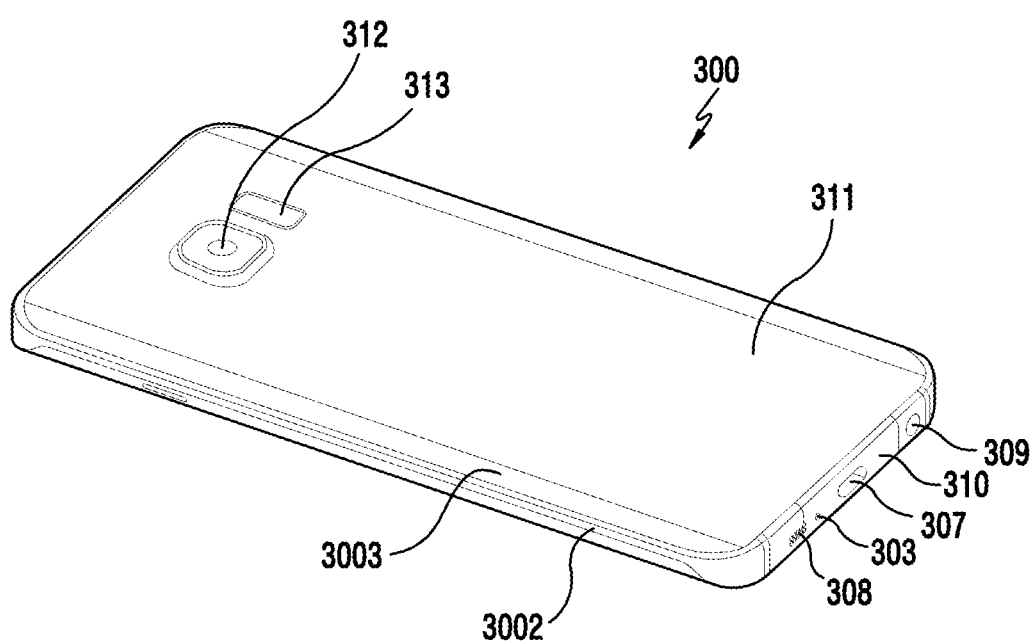
FIG. 3C is a rear side perspective view of the electronic device according to embodiments of the present disclosure.

FIG. 3A is a perspective view illustrating an electronic device according to embodiments of the present disclosure. FIG. 3B is a plan view of the electronic device according to embodiments of the present disclosure. FIG. 3C is a rear side perspective view of the electronic device according to embodiments of the present disclosure.

Referring to FIGS. 3A, 3B and 3C, the electronic device 300 may include a housing 310 formed of a conductive member and/or a non-conductive member. The display 301 includes a window, such as a front window or a glass plate, may be disposed on a first face 3001, such as the front face of the housing 310, may include a touch sensor so as to operate as a touch screen device, and may further include a pressure sensor so as to operate as a pressure-responsive touch screen device. The electronic device 300 may include a receiver 302, which is disposed in the housing 310 so as to output the voice of a communication partner, and a microphone device 303, which is disposed in the housing 310 so as to transmit the user's voice to the communication partner.

The electronic device 300 may include various components, which are exposed in the display 301, or are not exposed, in order to perform various functions of the electronic device 300. The components may include at least one sensor module 304 such as an illuminance sensor, a proximity sensor, an infrared sensor, an ultrasonic sensor, a fingerprint recognition sensor, or an iris recognition sensor, may include a front camera device 305, and an indicator, such as a light emitting diode (LED), configured to enable a user to recognize status information of the electronic device.

A speaker 308 may be disposed at one side of the microphone device 303, and an interface connector port 307 may be disposed at the other side of the microphone device 303 in order to receive a data transmission/reception function by an external device and external power to charge the electronic device 300. An ear jack hole 309 may be disposed at one side of the interface connector port 307.

In the display 301, substantially the entire first face 3001 of the electronic device 300 and a portion of a side face 3002 or a second face 3003 including the side face 3002 may be defined as a display region. In this case, the above-described electronic components may be disposed by performing the functions thereof within the electronic device through the display 301 (or a window) or by being exposed to the housing 310 other than the display region.

The electronic device 300 may include a rear window 311 disposed on the second face 3003, such as the rear face, opposite the first face 3001 of the housing 310, and may include a rear camera device 312 disposed on the second face 3003 and at least one electronic component 313 disposed on one side of the rear camera device 312. The electronic components 313 may include at least one of an illuminance sensor, a proximity sensor, an infrared sensor, an ultrasonic sensor, a heart rate sensor, a flash device, and a fingerprint recognition sensor.

The display 301 may include a flat portion 3011, and one or more bent regions 3012 and 3013 extending from the flat portion 3011 in a manner of being bent to a side face. The one or more bent portions may include a first bent portion 3012 bent to the right side face from the flat portion 3011 and a second bent portion 3013 bent from the flat portion 3011 to the left side face. However, the present disclosure is not limited thereto, and the display may include a bent portion that is bent to the upper side face from the flat portion 3011 or bent to the lower side face.

At least one of respective bent portions 3012 and 3013 may be bent by extending to at least a portion of the side face 3002 of the housing 310 or to at least a portion of the second face 3003 through the side face 3002 of the housing 310. The respective bent portions 3012 and 3013 may have the same curvature or different curvatures, and may be formed to have different bent regions.

According to embodiments, the electronic device 300 may include therein an input unit 320, at least a portion of which is exposed to the exterior of the electronic device 300 through at least one bent portion, and at least part of the input unit 320 may be exposed to the outside of the electronic device 300 to accommodate the user's operation.

The electronic device 300 may include a display module that is arranged to enable data input/output to a region including a flat portion and at least one bent portion of the display 301, and includes a flexible display panel (film), a touch panel (film), and/or a pressure-responsive sensor pad. The display 301 may be formed in a manner such that the top face and the rear face are simultaneously bent in a 3D manner, and may include a transparent glass material, such as sapphire glass, or a transparent synthetic resin window.

According to embodiments, the electronic device 300 may control the display 301 so as to selectively display information, to configure an input/output screen only on the flat portion 3011, to configure an input/output screen including one or more bent portions 3012 and 3013 together with the flat portion 3011, and to configure an input/output screen with only one or more bent portions 3012 and 3013, excluding the flat portion 3011.

When assembled into the electronic device 300, the input unit 320 may be arranged such that only a portion of the input unit 320 is exposed through a portion of the display region of the display 301. In order to induce manipulation of the input unit 320, the electronic device 300 may visually display a corresponding object around the input unit 320, which is exposed to one or more bent portions 3012 and 3013 of the display region of the display 301, and may adjust the resolution of the bent portion including the input unit 320 so as to display an image together with the flat portion.

Figure 4:
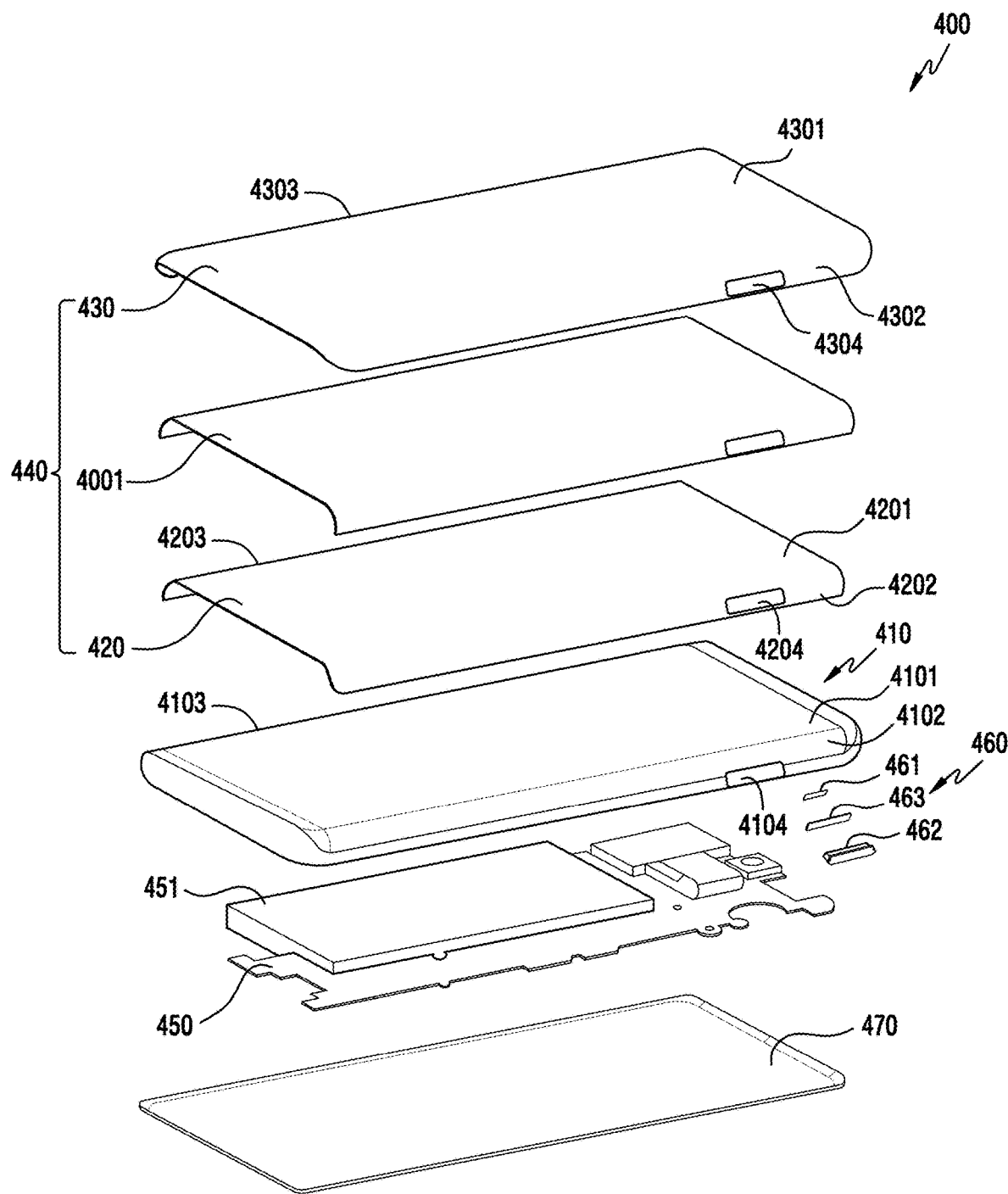
FIG. 4 is an exploded perspective view of an electronic device according to embodiments of the present disclosure.

FIG. 4 is an exploded perspective view of an electronic device according to an embodiment of the present disclosure.

Referring to FIG. 4, the electronic device 400 may include a housing 410 and a display 440 disposed on the upper portion of the housing 410, and may further include a battery 451, a substrate 450, and a rear cover 470, which are sequentially disposed in the lower portion the housing 410. The electronic device 400 may include an input unit 460, which is disposed in the housing 410 and is installed in such a manner that at least a portion of the electronic device 400 is exposed to the outside of the electronic device 400 through at least a portion of the display 440.

The display 440 may include a window 430, which forms the outward appearance of the electronic device 400 and a display module 420, which is attached to the rear face of the window 430. The display module 420 is formed of a flexible material, and is bonded to the rear face of the window 430 by an adhesive member 4001 while being preliminarily pressurized by a guide film disposed generally in an upper portion (on the window side) of the display module 420, which ensures smooth bonding even in the bent regions of the window 430.

The window 430 includes a first bent portion 4302 bent from the flat portion 4301 to the right side face and a second bent portion 4303 bent to the left side face from the flat portion 4301. However, only one of the first bent portion 4302 and the second bent portion 4303 may be disposed, or additional bent portions may be disposed. The window 430 may include a through hole 4304 formed in the first bent portion 4302. The through hole 4304 may guide a portion of the key button 462 of the input unit 460 to pass therethrough. The window 430 may include a separate structure, such as a strip of metal or a print, which is disposed along the perimeter of the through hole 4304.

The display module 420 may include a flat portion 4201 disposed at a position corresponding to the flat portion 4301 of the window 430, a first bent portion 4202 disposed in the flat portion 4201 at a position corresponding to the first bent portion 4302 of the window 430, and a second bent portion 4203 disposed at a position corresponding to the second bent portion 4303 of the window 430 in the flat portion 4201. The display module 420 may include an opening 4204 formed in the region of the first bent portion 4202 corresponding to the through hole 4304 of the window 430, i.e., in a groove shape at an end of the display module 420, or may be formed in the display region in the through hole 4304 of the window 430.

The housing 410 may include a conductive member and a non-conductive member, and may be formed such that the non-conductive member is coupled to the conductive member through an insert injection molding process or a dual injection molding process. However, the present disclosure is not limited thereto, and the housing 410 may be formed such that the conductive member and the non-conductive member are structurally coupled to each other by a piece of adhesive tape or bonding.

The housing 410 may include a flat portion 4101 disposed at a position corresponding to the flat portion 4301 of the window 430, a first bent portion 4102 disposed in the flat portion 4101 at a position corresponding to the first bent portion 4302 of the window 430, a second bent portion 4103 disposed at a position corresponding to the second bent portion 4303 of the window 430 in the flat portion 4101, and an opening 4104, which accommodates the input unit 460 in at least a portion therein and guides at least a portion of the key button 462 of the input unit 460 to be exposed to the outside of the electronic device 400 through the opening 4204 of the display 420 and the through hole 4304 of the window 430.

The input unit 460 may include a key button 462 and a terminal piece 463, such as an electrical product of a key, fixed to the key button 462. The key button 462 is movably fixed within a key accommodation space separately provided in the housing 410, and may be disposed by being electrically connected to a metal bracket 461 fixed to a conductive connection region, which is electrically connected to a substrate disposed in the space. The terminal piece 463 may include a substrate having a pressure sensor, may sense pressure by the pressing operation of the key button 462, and may provide sensed information to the substrate. According to one embodiment, at least the portion of the key button 462 that is disposed on the electronic device may be formed of the same material as the window 430 for aesthetic purposes. However, the present disclosure is not limited thereto, and the key button 462 may be formed of a material, such as a metal member, a polycarbonate (PC), or a fiber material, which is different from the window 430.

The substrate 450 may be disposed in the inner space of the housing 410, and the battery 451 may be disposed alongside the substrate 450. However, the present disclosure is not limited thereto, and the battery 451 may be disposed in a manner overlapping at least a portion of the substrate 450.

The rear cover 470 may be disposed in a manner of being attached to the housing 410, may be formed of a glass, metal, or synthetic resin material, and may be disposed by being attached to the housing 410 by an adhesive member, such as a waterproofing sealing member.

Figure 5A:
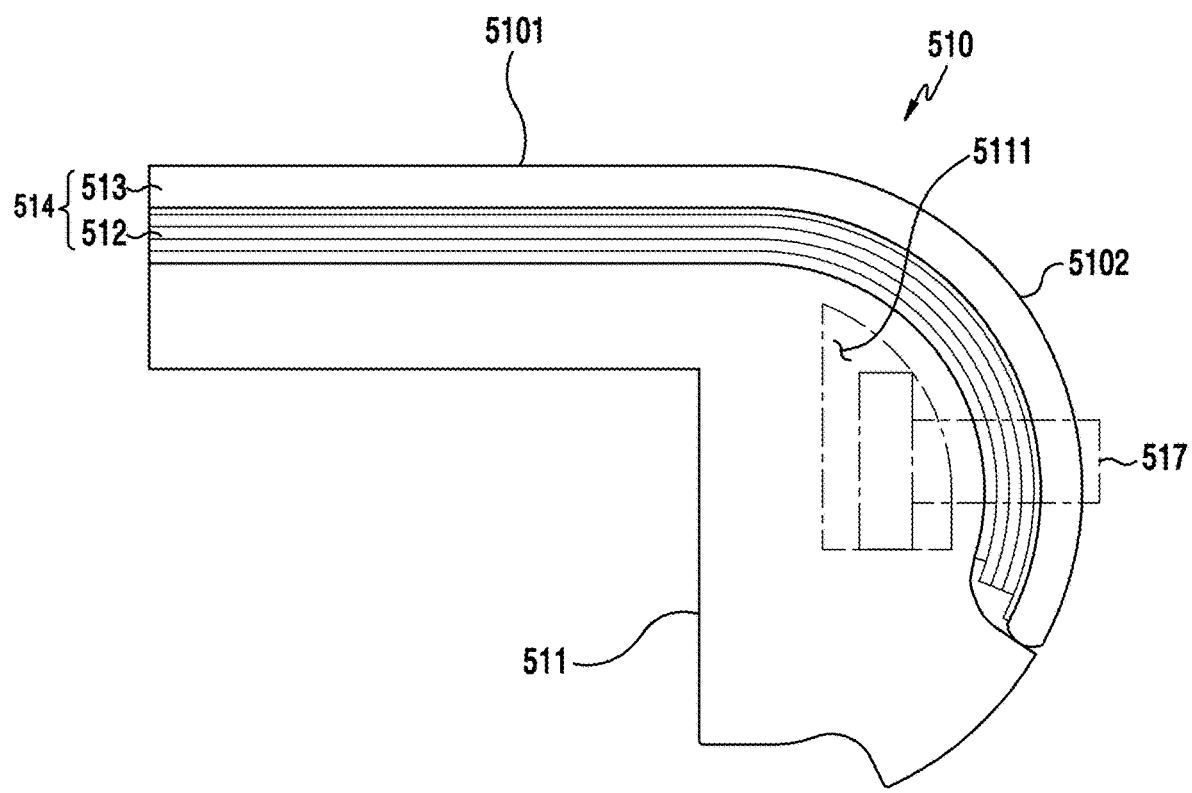
FIGS. 5A and 5B illustrate when an input unit is applied to a bent display according to embodiments of the present disclosure.
Figure 5B:
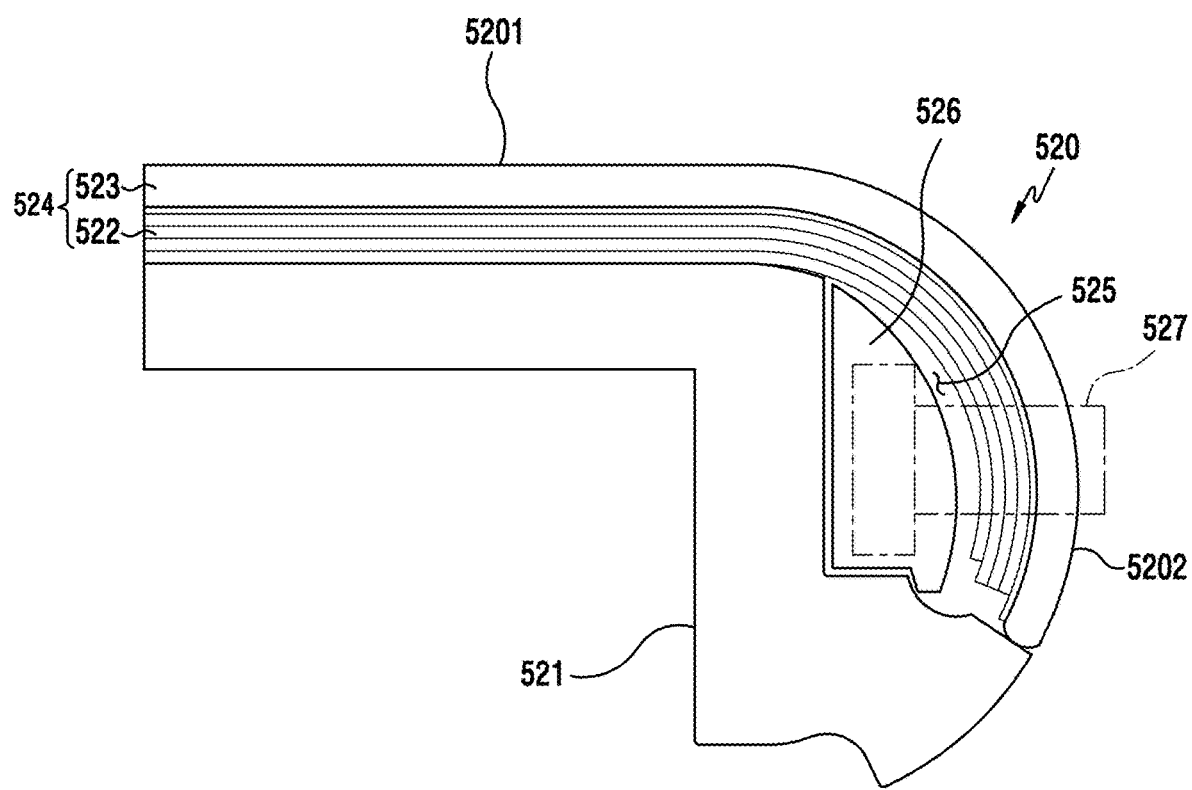

FIGS. 5A and 5B illustrate when an input unit is applied to a bent display according to embodiments of the present disclosure.

Referring to FIG. 5A, the electronic device 510 includes a display 514 disposed in such a manner that the display module 512 is attached to the rear face of the window 513, and a housing 511 to which the display 514 is coupled. The display 514 may include a flat portion 5101 and a bent portion 5102 extended to be bent from the flat portion 5101 with a predetermined curvature. The housing 511 may include a key accommodation space 5111 disposed to include at least a portion of an inner region or cavity formed by the bent portion 5102 of the display 514.

The key accommodation space 5111 may be formed integrally with the housing 511, and may be formed as a hermetically closed space except for a region, through which the key button 517 passes, for waterproofing purposes. Accordingly, the input unit 517 may be provided in the key accommodation space 5111, which is separately provided in the housing 511, and may be disposed such that at least a portion of the input unit 517 is exposed through the display 514.

Referring to FIG. 5B, an electronic device 520 may include a display 524 disposed such that a display module 522 is attached to the rear face of a window 523, and a housing 521, to which the display 524 is coupled. The display 524 may include a flat portion 5201 and a bent portion 5202 extend to be bent from the flat portion 5201 with a predetermined curvature. A cavity region 525 may be formed between the bent portion 5202 of the display 524 and the housing 521, a separate filler 526 may be disposed in the cavity region 525, and an input unit 527 installed through the filler 526 may be disposed by penetrating the display module 522 and the window 523 of the display 524.

Figure 6A:
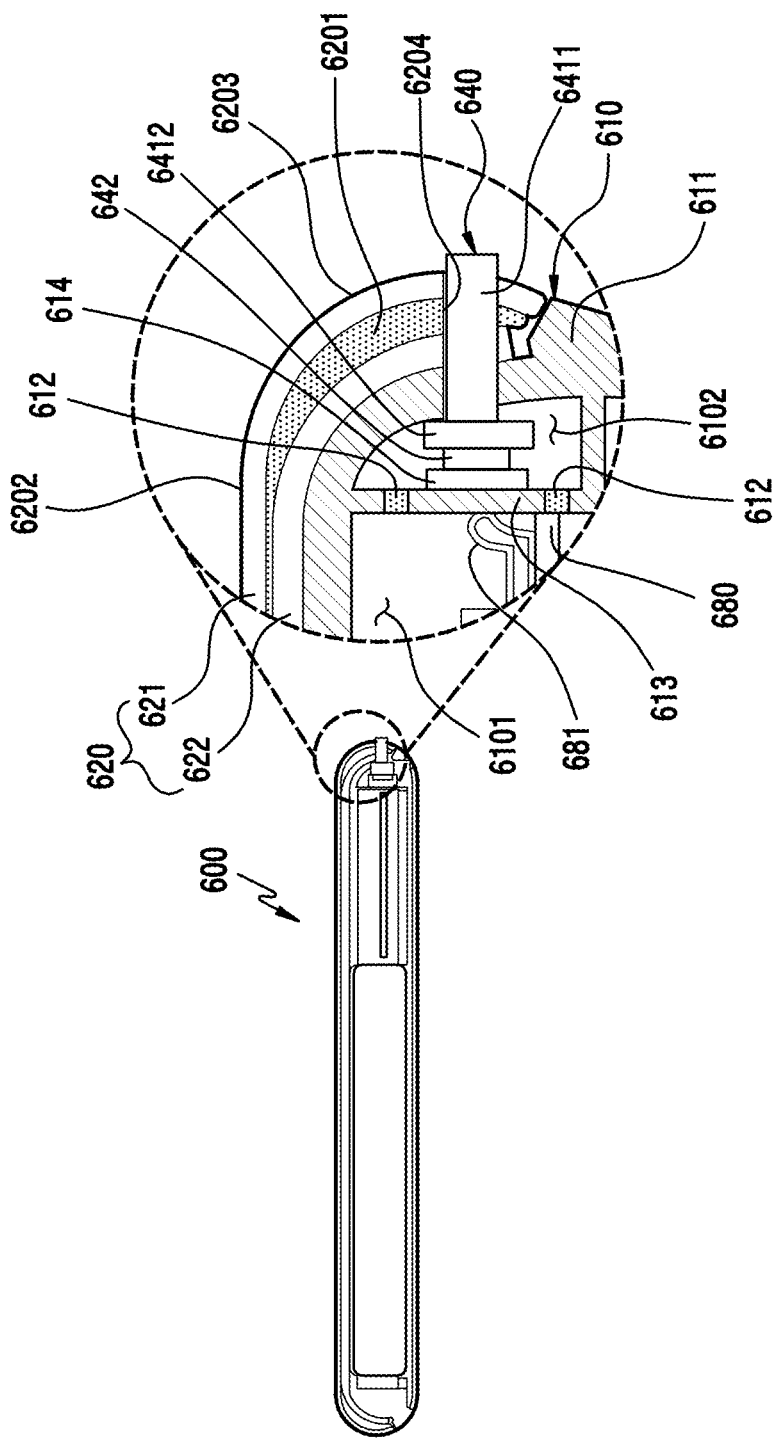
FIG. 6A is a cross-sectional view of an electronic device, to which an input unit according to embodiments of the present disclosure is applied.

FIG. 6A is a cross-sectional view of an electronic device, to which an input unit according to embodiments of the present disclosure is applied.

Referring to FIG. 6A, the electronic device 600 may include a display 620 including a flat portion 6202 and a bent portion 6203 extending from the flat portion 6202 with a predetermined curvature, a housing 610 in which the display 620 is mounted, and an input unit 640 disposed in the key accommodation space 6102 provided in the housing 610 so as to be at least partially exposed to the outside of the electronic device 600 through the housing 610 and the display 620. The electronic device 600 may further include a rear cover disposed on the rear face of the housing 610.

The display 620 may include a window 621 and a display module 622, which is attached to the rear face of the window 621. The bent portion 6203 may extend to at least a portion of a side face of the electronic device 600 or at least a portion of the rear face through the side face.

A seal member for waterproofing and dustproofing may be disposed between the display module 622 and the housing 610 so as to prevent moisture and foreign matter from being introduced through the display 620, and is also disposed for waterproofing and dustproofing in the entire electronic device 600 between the rear cover and the housing 610.

The housing 610 may include a separate key accommodation space 6102 formed to be spaced apart from the inner space 6101 where a substrate 680 is mounted. However, the inner space 6101 and the key accommodation space 6102 may be formed by the structural shape of the single housing 610. An input unit 640 may be disposed such that a key top 6411 of the input unit 640 penetrates from the inside of the key accommodation space 6102 to the outside and a key base 6412 disposed to extend from an end of the key top 6411 is secured inside the key accommodation space 6102.

A terminal piece 642 may be disposed at an end of the key base 6412 and may include a pressure-sensitive substrate. However, the present disclosure is not limited thereto, and the terminal piece 642 may include a substrate, on which a metal dome is mounted to perform a switching operation by a physical pressing operation. The terminal piece 642 may be disposed to be in physical contact with a metal bracket 614, such as a connection terminal, disposed in the key accommodation space 6102 of the housing 610.

The housing 610 may be formed through a double injection molding of a conductive member 611 and a non-conductive member 612. When the display 620 is installed in the housing 610, the region where the bracket 614 is disposed may be formed of the non-conductive member 612. The bracket 614 may be fixed to the conductive connection region 613 disposed in the non-conductive member 612. The conductive connection region 613 may be maintained as insulated from the conductive member 611 by the non-conductive member 612, may be formed of the same metal material as the conductive member 611 or may be formed of a metal material different from that of the conductive member 611, and may be formed of the same material as the metal bracket 614, which is in contact with and/or fixed to the conductive connection region 613, in consideration of galvanic corrosion or the like. The metal bracket 614 may include a resilient spring contact or a pogo pin.

A substrate 680 may be disposed in the inner space 6101 of the housing 610. The connection terminal 681 may be mounted on the substrate 680, and may be maintained in physical contact with the conductive connection region 613 disposed in the boundary portion with the key accommodation space 6102 in the inner space 6101. Accordingly, the terminal piece 642 of the input unit 640 may be electrically connected to the substrate 680 through the bracket 614 disposed in the key accommodation space 6102 of the housing 610 and attached to the conductive connection region 613; the conductive connection region 613, and the connection terminal 681 disposed in the inner space 6101 of the housing 610.

The input unit 640, which is disposed in the key accommodation space 6102 formed separately from the inner space 6101 of the housing 610, may be electrically connected to the substrate 680, which is disposed in the inner space 6101 without passing through a separate open portion of the housing 610. Such a configuration is advantageous for implementing a waterproof/dustproof structure preventing moisture from permeating into the internal space 6101 of the housing 610 even if the moisture is introduced through a through hole 6204 in the display 620.

At least one adhesive member 6201 for attaching the display module 622 and the window 621 to each other may be disposed between the display module 622 and the window 621. The adhesive member 6201 may include an optically clear resin (OCR) 7001 or an optical clear adhesive (OCA) 7002. When the bent portions of the display module 622 and the bending portion of the window 621 are formed to have different curvatures, the adhesive member between the display module 622 and the window 621 may be applied with different thicknesses.

Figure 6B:
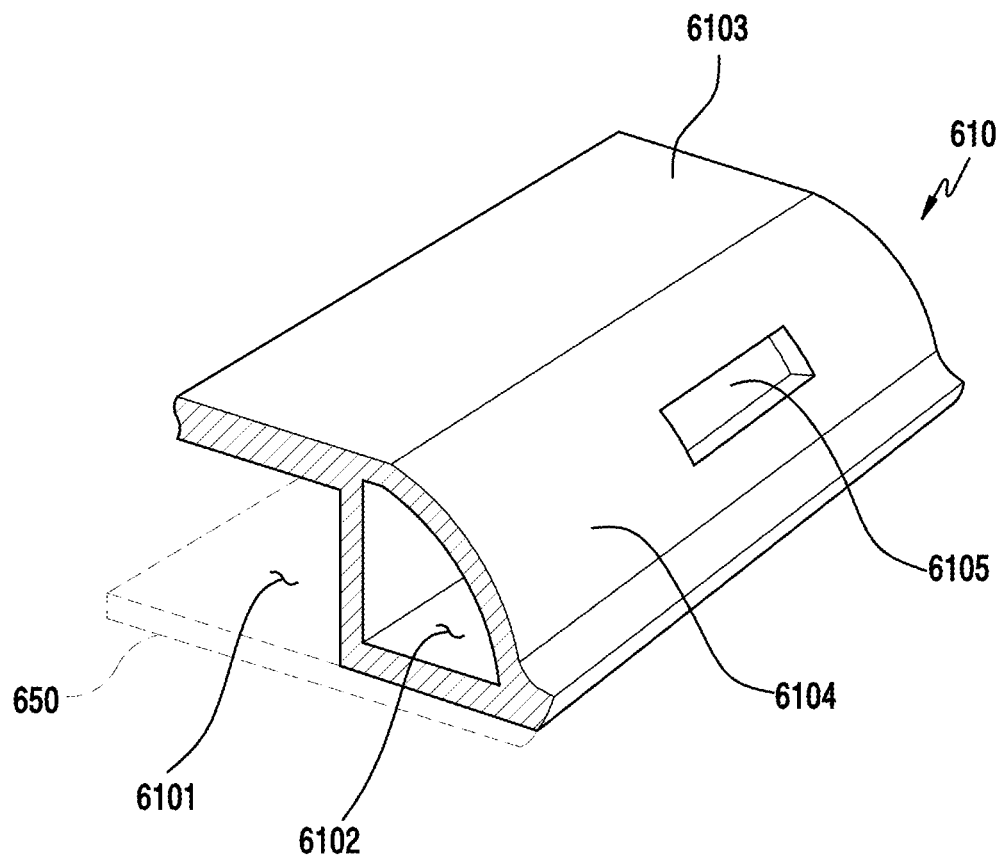
FIG. 6B is a perspective view of a main part, which illustrates the configuration of the housing of FIG. 6A, according to embodiments of the present disclosure.

FIG. 6B is a perspective view of a main part, which illustrates the configuration of the housing 610 of FIG. 6A, according to embodiments of the present disclosure.

Referring to FIG. 6B, the housing 610 including a flat portion 6103 and a bent portion 6104 extending from the flat portion 6103 with a predetermined curvature. The housing 610 may include an inner space 6101 for accommodating the substrate 680 and a key accommodation space 6102 for accommodating an input unit 640. The inner space 6101 is sealed from the outside by the rear cover 650. The key accommodation space 6102 may be formed as a closed cavity, and may include a key penetration hole 6105 formed from the key accommodation space 6102 to a outer surface of the bent portion 6104 so as to enable the input unit 640 disposed in the key accommodation space 6102 to pass through the key penetration hole 6105.

Figure 6C:
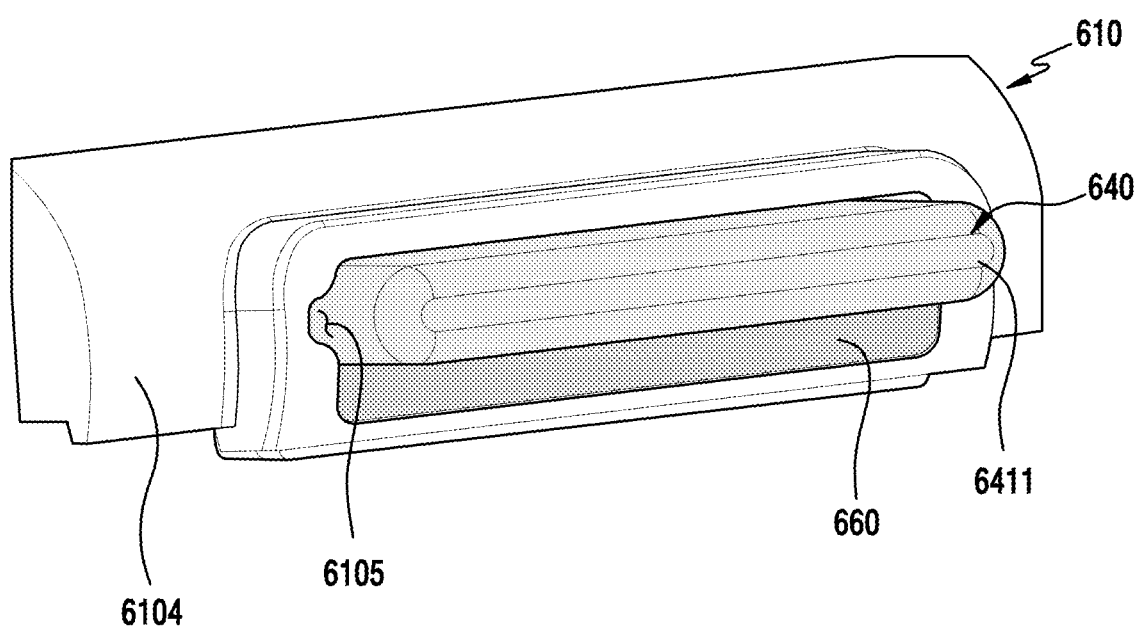
FIG. 6C is a perspective view illustrating when an input unit is mounted on the housing of FIG. 6A, according to embodiments of the present disclosure.

FIG. 6C is a perspective view illustrating when an input unit is mounted on the housing of FIG. 6A, according to embodiments of the present disclosure.

Referring to FIG. 6C, the input unit 640 may be inserted from the outside of the housing 610 through a key penetration hole 6105, which is formed in the key accommodation space 6102 of the housing 610, and then fixed. The input unit 640 is fixed within the key accommodation space 6102 and may be exposed to the outside of the electronic device 600 through the key penetration hole 6105 and the through hole 6204 in the display 620 of the electronic device 600.

Since the key penetration hole 6105 is formed to have a size capable of accommodating up to a key base 6412 having a substantially larger area than the key top 6411, a separation prevention piece 660 may be further provided for closing a region remaining after the input unit 640 is mounted in the key penetration hole 6105. The separation prevention piece 660 may be formed of at least one of a metal member, a rubber member, a silicon member, a urethane member, and a PC. When a portion of the input unit 640 penetrates through the key penetration hole 6105 and the separation prevention piece 660 is fixed, the input unit 640 is inserted into the key accommodation space 6102 of the housing 610 so that the input unit 640 can be restrained and prevented from being separated to the outside from the key accommodation space 6102 of the housing 610.

Figure 7A:
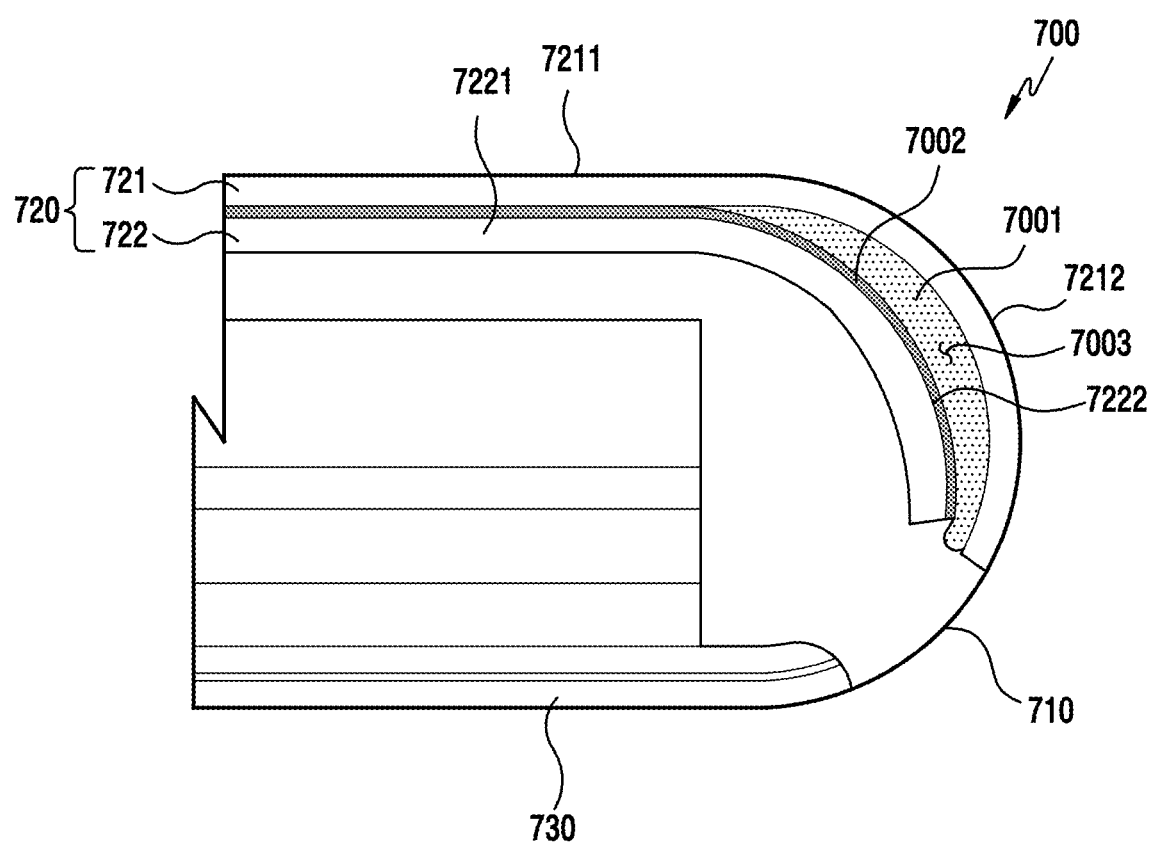
FIGS. 7A and 7B are cross-sectional views of a main part, which illustrates the assembly state of a display according to embodiments of the present disclosure.
Figure 7B:
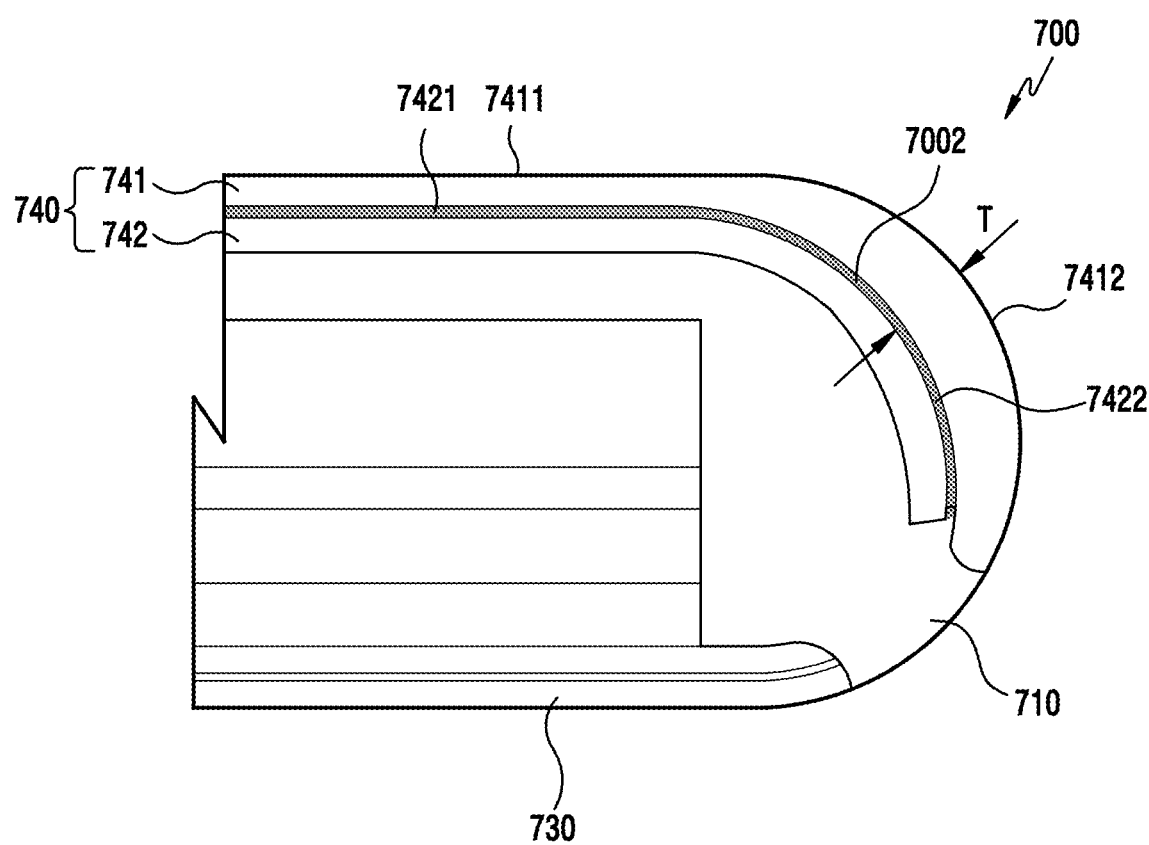

FIGS. 7A and 7B are cross-sectional views of a main part, which illustrates the assembly state of a display according to embodiments of the present disclosure.

The bent portions of the display module of the display and the window may be formed to have the same curvature as described above. However, when the bent portions of the display module and the window are formed to have different curvatures, a compensating unit for compensating for a gap formed between the display module and the window may be provided.

Referring to FIG. 7A, an electronic device 700 may include a housing 710, a display 720 disposed in the upper portion of the housing 710, and a rear cover 730 disposed in the lower portion of the housing 710. The display 720 may include a window 721 and a display module 722, which is disposed on the rear face of the window 721. The window 721 may include a flat portion 7211 and a bent portion 7212 formed to extend from the flat portion 7211 with a first curvature. The display module 722 may include a flat portion 7221 and a bent portion 7222 formed to extend from the flat portion 7221 with a second curvature. The first curvature and the second curvature may be different from each other, such that the second curvature may be larger than the first curvature.

Since the respective bent portions 7212 and 7222 of the window 721 and the display module 7221 in the display have different curvatures, cavities 7003 may be formed in the corresponding regions, and one or more optical adhesive members 7001 and 7002 may be attached to and filled in the cavities. At least one optical adhesive member may include an OCR 7001 or an OCA 7002.

As illustrated, the window and display module are attached to each other by the OCA, and the cavities may be filled with the OCR. However, the present disclosure is not limited thereto, and only one adhesive member of the OCR and the OCA may be used, or different adhesive members may be arranged in multiple layers.

Referring to FIG. 7B, an electronic device 700 may include a housing 710, a display 740 disposed in the upper portion of the housing 710, and a rear cover 730 disposed in the lower portion of the housing 710. The display 740 may include a window 741 and a display module 742, which is disposed on the rear face of the window 741. The window 741 may include a flat portion 7411 and a bent portion 7412 formed to extend from the flat portion 7411 with a first curvature. The display module 742 may include a flat portion 7421 and a bent portion 7422 formed to extend from the flat portion 7421 with a second curvature. The first curvature and the second curvature may be different from each other, a cavity, which is formed between the bent portion 7412 of the window 741 and the bent portion 7422 of the display module 742 may be compensated by the thickness T of the bent portion 7412 of the window 741, which is formed to be thicker than other regions. In this case, the display module 742 may be attached to the rear face of the window 741 by the optical adhesive 7002.

Figure 8A:
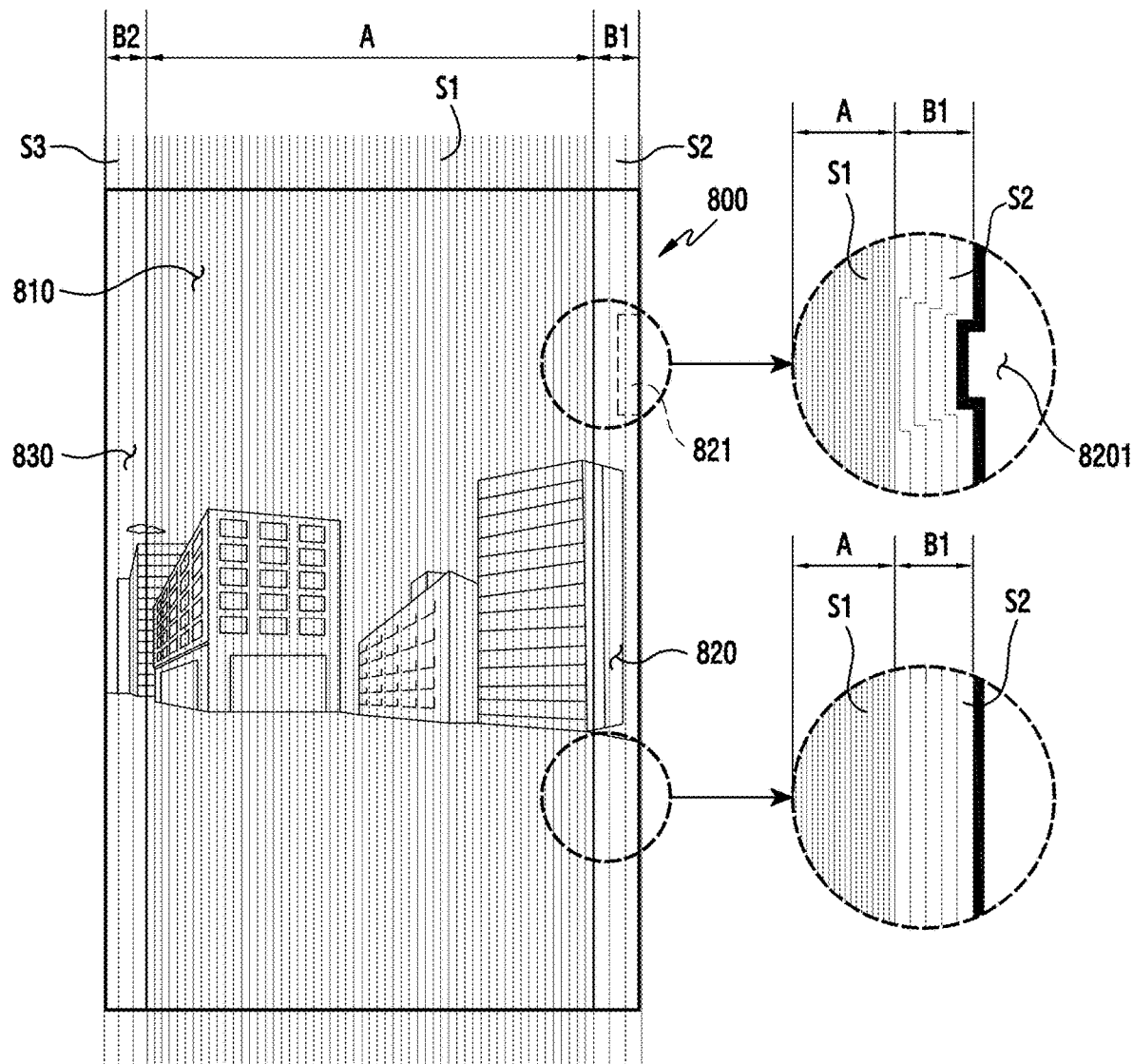
FIGS. 8A and 8B are configuration views of a display module illustrating the arrangement of signal lines according to the arrangement of an input unit according to embodiments of the present disclosure.
Figure 8B:
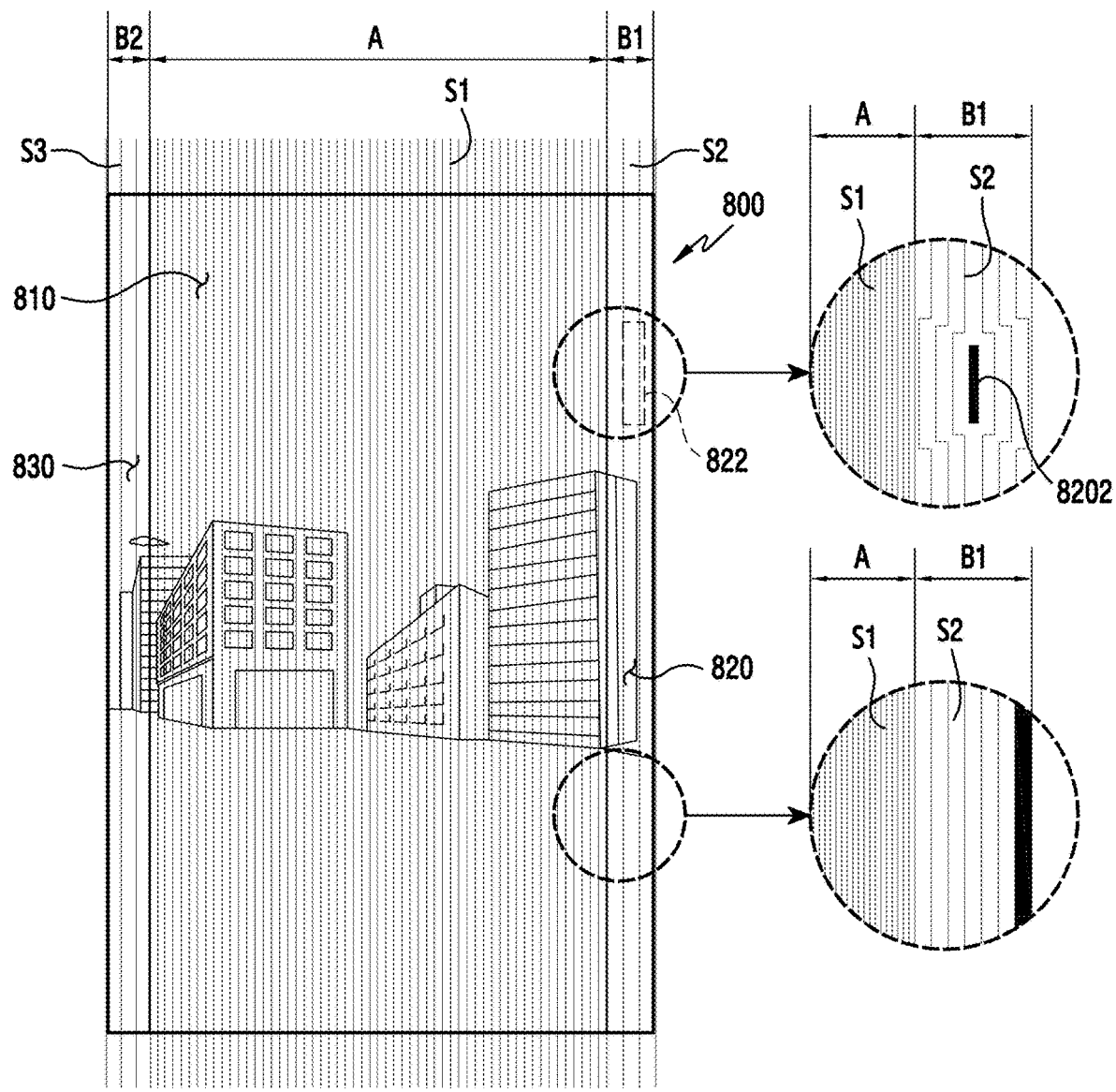

FIGS. 8A and 8B are configuration views of a display module illustrating the arrangement of signal lines according to the arrangement of an input unit according to embodiments of the present disclosure.

Referring to FIG. 8A, an input unit 821 may be disposed to be exposed to the outside of the electronic device by penetrating at least a portion of a display module 800, may be installed to penetrate at least a portion of the bent portions 820 and 830 of the display module 800, and may be disposed so as to penetrate an opening 8201, which is formed such that an edge portion of a first bent portion 820 of the display module 800 is recessed.

The display module 800 may include: a flat portion 810 (section A of FIG. 8A), a first bent portion 820 (section B1 of FIG. 8A) extending from one side of the flat portion 810 to be bent with a first curvature, and a second bent portion 830 (section B2 of FIG. 8A) extending from the other side of the flat portion 810 to be bent with a second curvature. The first curvature and the second curvature may be the same as or different from each other. The electronic device may display an image through at least one of the flat portion 810, the first bent portion 820, and the second bent portion 830.

The first bent portion 820, in which the input unit 821 is disposed, may include a plurality of second signal lines S2, which are arranged differently from the first signal lines S1 arranged in the flat portion 810, by an opening 8201, which is formed in order to accommodate the input unit 821. The plurality of second signal lines S2 may be arranged away from the opening 8201. The interval between respective unit signal lines in the plurality of first signal lines S1 arranged in the flat portion 810 may be closer than the interval between respective unit signal lines in the plurality of second signal lines S2 arranged in the first bent portion 820. The interval between respective unit signal lines in the plurality of second signal lines S2 arranged in the first bent portion 820 may be twice the interval between respective unit signal lines in the plurality of first signal lines S1. However, the present disclosure is not limited thereto, and the interval between respective unit signal lines in the plurality of second signal lines S2 may be determined depending on the size or shape of the opening 8201, since the second signal lines S2 in the first bent portion 820 are arranged away from the opening 8201, unlike the flat portion 810.

The second bent portion 830 may include a plurality of third signal lines S3 having the same arrangement as the plurality of second signal lines S2 of the first bent portion 820. However, the present disclosure is not limited thereto, and since the input unit 821 does not exist in the second bent portion 830, the third signal lines S3 may be arranged in the same manner as the plurality of first signal lines S1.

The first signal lines S1, the second signal lines S2 and the third signal lines S3 may include a plurality of electrode lines and/or data lines provided for a plurality of pixels as the constituent elements of the display module. Therefore, the image displayed on the flat portion 810 (section A) of the display module 800 may have a relatively higher resolution than that of an image displayed on the first bent section 820 (section B1).

Referring to FIG. 8B, the input unit 822 disposed in the first bent portion 820 of the display module 800 may be exposed to the outside of the electronic device through the through hole 8202, which is formed in the second bent portion 830. In this case, the plurality of second signal lines S2 disposed in the first bent portion 820 may also be disposed so as to avoid the through holes 8202. The interval of respective unit signal lines in the plurality of second signal lines S2 may be determined depending on the size or shape of the through hole 8202.

Figure 9A:
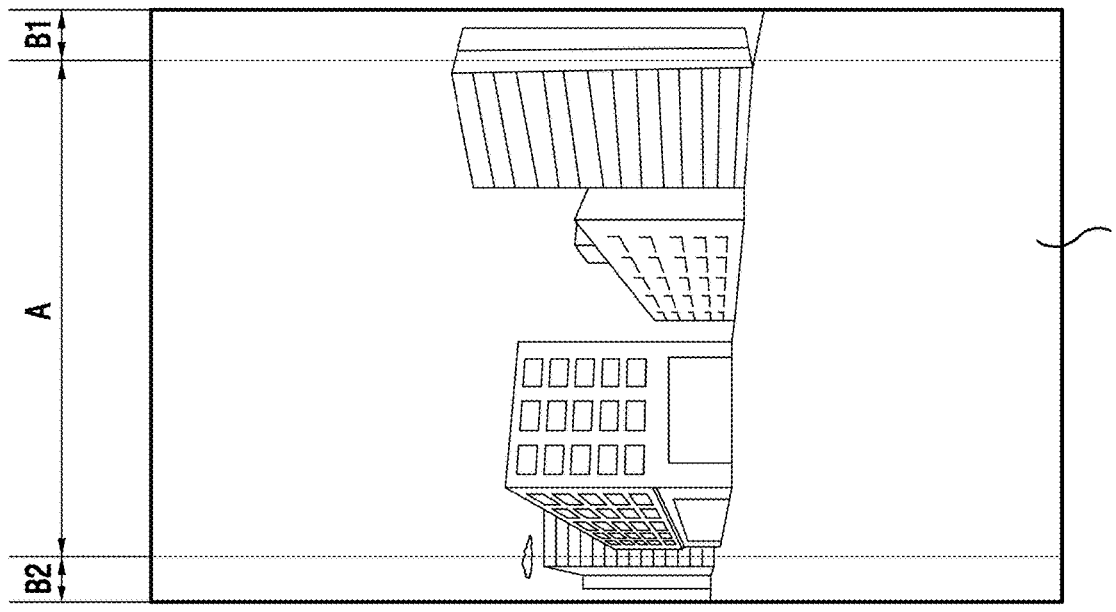
FIG. 9A illustrates an image optimization process by a display driver integrated circuit (DDI) according to embodiments of the present disclosure.
Figure 9A:
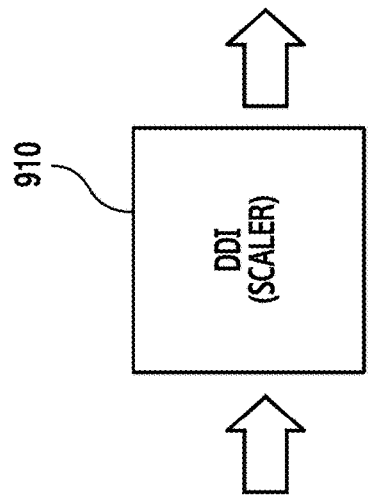
Figure 9A:
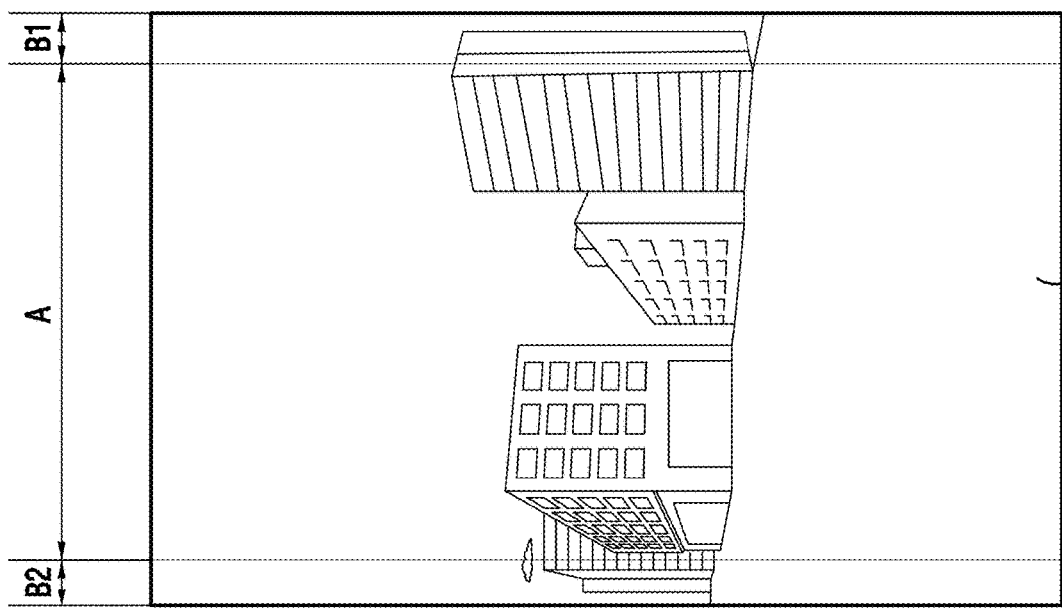

FIG. 9A illustrates an image optimization process by a DDI according to embodiments of the present disclosure.

An electronic device may include a DDI 910. For a received raw image 920, the DDI 910 may scale images of corresponding regions so as to have respective corresponding resolutions, based on a first resolution of the flat portion of a display and a second resolution corresponding to regions B1 and B2 corresponding to bent portions of the display. The DDI 910 may optimize images, which have been processed to correspond to the resolution information of respective regions A, B1, and B2, as one image 930, and may display the image 930 on the display.

The DDI 910 may deform, by a software program stored in a memory, a received raw image 920 such that respective regions A, B1, and B2 of the image have corresponding resolutions based on corresponding resolutions, and the DDI 910 may perform control such that deformed image is manipulated into an image 930 and is displayed on the display.

Figure 9B:
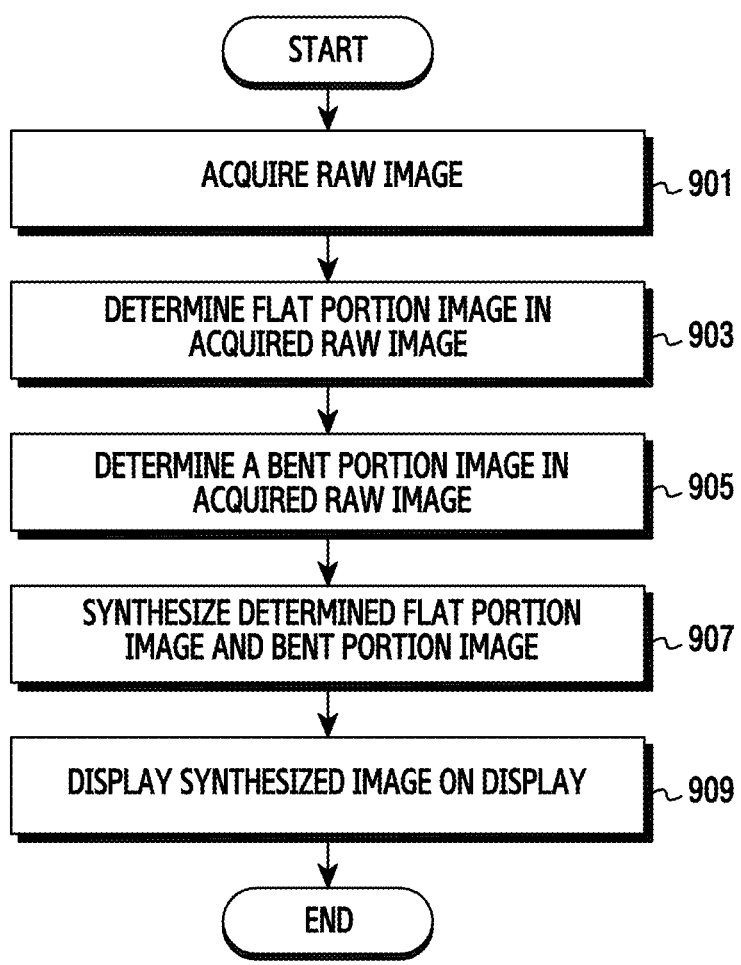
FIG. 9B illustrates a procedure for displaying an image through a flat portion and a bent portion of a display according to embodiments of the present disclosure.

FIG. 9B illustrates a procedure for displaying an image on a flat portion and a bent portion of a display according to embodiments of the present disclosure.

According to embodiments, the present disclosure may provide an image display method for displaying an image on a display module including a flat portion and at least one bent portion.

Referring to FIG. 9B, in step 901, the electronic device may acquire a raw image, and a processor may acquire at least one image stored in the memory of the electronic device, such as by a camera module.

In step 903, for the acquired raw image, the processor may determine a flat portion image to be displayed in a section corresponding to the flat portion of the display module, and may control the DDI to change the flat portion image so as to have the first resolution corresponding to the flat portion. However, the present disclosure is not limited thereto, and the acquired raw image may be directly processed by the DDI.

In step 905, for the acquired raw image, the processor may determine a bent portion image to be displayed in a section corresponding to a bent portion of the display module, and may control the DDI to change the bent portion image to have the second resolution corresponding to the bent portion. The first resolution may be set to be higher than the second resolution by the plurality of signal lines, which are arranged so as to avoid the input unit disposed in the bent portion. For example, when the overall resolution of the raw image is 200 ppi (pixels per inch or dpi (dots per inch)), the processor may change the resolution of the section corresponding to the bent portion to 100 ppi (or dpi).

In step 907, the processor may perform an operation of optimizing the changed flat portion image and bent portion image by the DDI. However, the present disclosure is not limited thereto, and, for a raw image received by a software program, such as an image scaling and synthesizing program stored in a memory, the processor may change and optimize corresponding images to have respective corresponding resolutions, based on a resolution corresponding to the flat portion of the display module and a resolution corresponding to a bent portion of the display module.

The processor may process the flat portion image having the first resolution and the bent portion image having the first resolution into a single image in step 907, and may display the single image on the display module in step 909.

Figure 10:
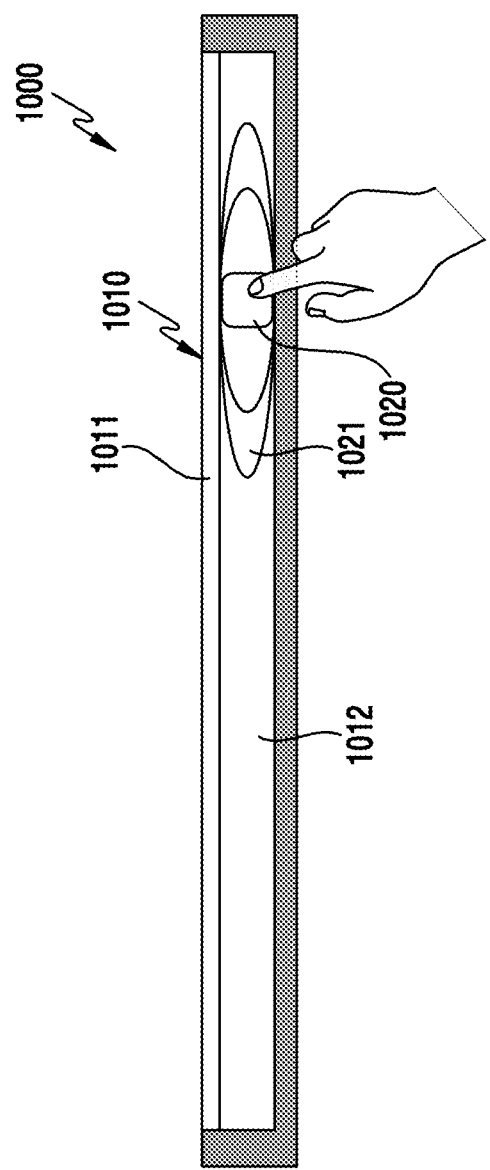
FIG. 10 illustrates a state when various visual objects are applied around a key button through a display according to embodiments of the present disclosure.

FIG. 10 illustrates when various visual objects are applied around a key button through a display according to embodiments of the present disclosure.

Referring to FIG. 10, the electronic device 1000 may include a display 1010 including a flat portion 1011 disposed on the front face of the electronic device 1000, and a bent portion 1012 bent from the flat portion 1011 to at least a portion of a side face of the electronic device 1000 or at least a portion of the rear face of the electronic device 1000. The bent portion 1012 may be formed to an outwardly bent shape having a predetermined curvature.

The electronic device 1000 may be provided with the key button 1020, which is disposed to penetrates the bent portion 1012 of the display 1010 and includes at least one of a pressure-responsive structure, a physical-pressing structure including a dome key, a structure of detecting a change in capacitance, an electromagnetic induction structure, and a structure using selective energization by a piezoelectric member.

When the pressing of the key button 1020 is detected, the electronic device 1000 may display an object 1021 for providing a visual indication to a user in the peripheral region of the key button 1020 of the bent portion 1012. The object 1021 for visual indication may include a change in the shape of a dynamically moving object or a change in the color of an object, for example.

The object for visual indication may include a change in the shape of a dynamically moving object or in the color of an object, for example.

Embodiments of the present disclosure are capable of smoothly displaying an image through a region even if an input unit is exposed through a bent display. Also, since the input unit is exposed through the display, the convenience in using the input unit is enhanced, and device aesthetics and grip feel are also enhanced by the bent display.

According to embodiments of the present disclosure, an electronic device includes a housing including a first face, a second face facing away from the first face, and a side face surrounding a space between the first face and the second face, a display mounted on the housing and including a flat portion substantially corresponding to the first face and a bent portion extending in a lateral direction from the flat portion, at least one input unit disposed between the bent portion of the display and the housing and at least partially exposed outwardly through at least a portion of the bent portion, a detection circuit disposed inside the housing and electrically connected to the input unit, the detection circuit being configured to detect an operation of the input unit, and at least one processor functionally connected to the detection circuit and the display and configured to perform control so as to cause the electronic device to perform a corresponding function according to a received detection signal. An interval of unit signal lines in a plurality of first signal lines arranged on the flat portion of the display is different from an interval of unit signal lines in a plurality of second signal lines disposed in the bent portion.

The second signal lines may be arranged away from a portion which is penetrated by the input unit in the bent portion.

The interval between the unit signal lines in the first signal lines may be closer than the interval between the unit signal lines in the second signal lines.

The first signal lines and the second signal lines may include an electrode line or a data line for a pixel.

The housing may include a closed accommodation space formed to extend in a position corresponding to the bent region, and the input unit may be disposed in the accommodation space, and may be partially penetrated through a through hole formed in the accommodation space.

The housing may be formed by a double injection molding process using a non-conductive member and a conductive member, and a boundary region between an inner space of the housing and the accommodation space may include a conductive connection region formed to be insulated from the conductive member therearound by the non-conductive member. The at least one input unit may be electrically connected to the conductive connection region in the accommodation space of the housing.

The conductive connection region may be electrically connected to the detection circuit inside the housing.

The display may include a window and a display module arranged on the rear face of the window.

An exposed portion of the at least one input unit may be exposed through an opening or through hole formed in at least a portion of a region corresponding to the bent portion of the display module and through the window.

The bent region of the display module may be formed to have a curvature larger than a curvature of the bent region of the window.

The electronic device may further include at least one adhesive member formed in at least one layer and disposed in a space formed between the bent region of the display module and the bent region of the window.

The at least one adhesive member may include an OCA or an OCR.

The at least one input unit may include at least one of a speaker device, a microphone device, a camera device, various sensor devices, an interface connector device, a flash device, and an external card storage device.

The at least one input unit may include at least one of a pressure-responsive structure, a physical-pressing structure including a dome key, a structure of detecting a change in capacitance, an electromagnetic induction structure, and a structure using selective energization by a piezoelectric member.

According to embodiments of the present disclosure, a method of displaying an image of an electronic device that includes a display having a flat portion and at least one bent portion bent from the flat portion with a predetermined curvature includes acquiring a raw image corresponding to an entire region of the display, determining a first image corresponding to the flat portion in the acquired raw image, determining a second image corresponding to the bent portion in the acquired raw image, synthesizing the determined first image and second image, and displaying a synthesized image on the display.

The method may further include changing the first image to an image having a first resolution, and changing the second image to an image having a second resolution.

The method may further include setting the first resolution to be higher than the second resolution when the input unit is exposed through at least a portion of the bent portion.

The method may further include detecting an operation of the input unit, and displaying at least one object for visual indication in a peripheral region of the input unit in the bent portion.

The at least one object for visual indication may include a change in a shape of a dynamically moving object or a change of a color of an object.

The method may further include detecting a current state of the electronic device, and displaying the at least one object for visual indication in a peripheral region of the input unit in the bent portion in order to guide a user to operate the input unit.

According to embodiments of the present disclosure, an electronic device includes a display formed in at least a portion of the electronic device, and including a first region and a second region bent at a designated angle from the first region, an input unit configured to sense a user's input through an opening formed in at least a portion of the second region of the display, and a bracket in which at least a portion of the input unit is functionally connected to a control circuit.

The first region of the display may be set to a first resolution and the second region of the display may be set to a second resolution.

The display may include at least one data line for moving at least one data for displaying an image or at least one scan line for acquiring the user's input, wherein each of the data line and the scan line is formed to be arranged differently based on a distance from the input unit.

Each of the above-described component elements of hardware according to the present disclosure may be configured with one or more components, and the names of the corresponding component elements may vary based on the type of electronic device. The electronic device according to embodiments of the present disclosure may include at least one of the aforementioned elements. Some elements may be omitted or other additional elements may be further included in the electronic device. Also, some of the hardware components according to embodiments may be combined into one entity, which may perform functions identical to those of the relevant components prior to the combination.

Embodiments of the present disclosure have been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

What is claimed is:

1. An electronic device comprising:
a window forming at least part of a front surface of the electronic device, the window including a flat portion and a bent portion, the bent portion including a through hole;
a display comprising a flat portion visible via the flat portion of the window and a bent portion visible via the bent portion of the window, the bent portion of the display including an opening aligned with the through hole;
at least one input unit passing through the through hole and the opening; and
a circuit configured to generate a signal when the at least one input unit is pressed,
wherein an interval between unit signal lines in a plurality of first signal lines arranged on the flat portion of the display is different from an interval between unit signal lines in a plurality of second signal lines disposed in the bent portion of the display.

2. The electronic device of claim 1,
wherein the second signal lines are arranged away from a portion which is penetrated by the input unit in the bent portion of the display.

3. The electronic device of claim 1,
wherein the interval between the unit signal lines in the first signal lines is closer than the interval between the unit signal lines in the second signal lines.

4. The electronic device of claim 1,
wherein the first signal lines and the second signal lines include an electrode line or a data line for a pixel.

5. The electronic device of claim 1, further comprising:
a housing including a first face, a second face facing away from the first face, and a side face surrounding a space between the first face and the second face,
wherein the housing includes a closed accommodation space formed to extend in a position corresponding to the bent portion of the display, and
wherein the at least one input unit is disposed in the accommodation space, and is partially penetrated through a through hole formed in the accommodation space.

6. The electronic device of claim 5,
wherein the housing is formed by a double injection molding process using a non-conductive member and a conductive member,
wherein a boundary region between an inner space of the housing and the accommodation space includes a conductive connection region formed to be insulated from the conductive member around the conductive connection region by the non-conductive member, and
wherein the at least one input unit is electrically connected to the conductive connection region in the accommodation space of the housing.

7. The electronic device of claim 6,
wherein the conductive connection region is electrically connected to the circuit inside the housing.

8. The electronic device of claim 1,
wherein the display includes a display module arranged on a rear face of the window.

9. The electronic device of claim 8, wherein an exposed portion of the at least one input unit is exposed through an opening or through hole formed in at least a portion of a region corresponding to the bent portion of the display module and through the through hole of the window.

10. The electronic device of claim 1,
wherein the bent portion of the display is formed to have a curvature larger than a curvature of the bent portion of the window.

11. The electronic device of claim 1, further comprising:
at least one adhesive member formed in at least one layer and disposed in a space formed between the bent portion of the display and the bent portion of the window.

12. The electronic device of claim 11,
wherein the at least one adhesive member includes an optical clear adhesive or an optical clear resin.

13. The electronic device of claim 1, further comprising:
at least one of a speaker device, a microphone device, a camera device, various sensor devices, an interface connector device, a flash device, and an external card storage device.

14. The electronic device of claim 1,
wherein the at least one input unit includes at least one of a pressure-responsive structure, a physical-pressing structure including a dome key, a structure of detecting a change in capacitance, an electromagnetic induction structure, and a structure using selective energization by a piezoelectric member.

* * * * *